United States Patent
Li et al.

(10) Patent No.: US 12,325,593 B2
(45) Date of Patent: Jun. 10, 2025

(54) THREE-DIMENSIONAL WAREHOUSE HANDLING AND DISPATCHING SYSTEM AND METHOD FOR IMPLEMENTING ITEM PICKING

(71) Applicant: BEIJING GEEKPLUS TECHNOLOGY CO., LTD., Beijing (CN)

(72) Inventors: Hongbo Li, Beijing (CN); Jian Wang, Beijing (CN)

(73) Assignee: Beijing Geekplus Technology Co., Ltd., Beijing (CN)

( * ) Notice: Subject to any disclaimer, the term of this patent is extended or adjusted under 35 U.S.C. 154(b) by 0 days.

(21) Appl. No.: 17/924,070

(22) PCT Filed: Jun. 2, 2021

(86) PCT No.: PCT/CN2021/097977
§ 371 (c)(1),
(2) Date: Nov. 8, 2022

(87) PCT Pub. No.: WO2022/017010
PCT Pub. Date: Jan. 27, 2022

(65) Prior Publication Data
US 2023/0174305 A1    Jun. 8, 2023

(30) Foreign Application Priority Data
Jul. 24, 2020   (CN) .......................... 202010722774.0

(51) Int. Cl.
*G06F 7/00*   (2006.01)
*B65G 1/04*   (2006.01)
(Continued)

(52) U.S. Cl.
CPC ......... *B65G 1/1373* (2013.01); *B65G 1/0492* (2013.01); *B65G 1/065* (2013.01)

(58) Field of Classification Search
CPC .... B65G 1/1373; B65G 1/0492; B65G 1/065; B65G 1/1378; G06Q 10/08
(Continued)

(56) References Cited

U.S. PATENT DOCUMENTS 10,029,851 B1   7/2018 Durham et al.
2006/0239801 A1  10/2006 Gudehus et al.
(Continued)

FOREIGN PATENT DOCUMENTS

CN   201923581   8/2011
CN   102947205   2/2013
(Continued)

OTHER PUBLICATIONS

PCT International Search Report and Written Opinion in International Application No. PCT/CN2021/097977, dated Aug. 27, 2021, 12 pages (English translation).
(Continued)

*Primary Examiner* — Yolanda R Cumbess
(74) *Attorney, Agent, or Firm* — Fish & Richardson P.C.

(57) ABSTRACT

Three-dimensional warehouse handling and dispatching systems, devices, and methods for implementing item picking are provided. In one aspect, a system includes: one or more control centers, one or more first handling devices, one or more second handling devices, at least one lifting device, and at least one three-dimensional warehouse including floors connected by the at least one lifting device. The one or more control centers are configured to: select, according to a handling task, a first handling device, a second handling device, and a lifting device for performing the handling task, and send a handling instruction for performing the handling task separately to the first handling device, the second handling device, and the lifting device, such that the lifting device is used to handle an item indicated in the handling (Continued)

instruction, and the first and second handling devices cooperate to transport the item in the at least one three-dimensional warehouse.

20 Claims, 9 Drawing Sheets

(51) Int. Cl.
*B65G 1/06* (2006.01)
*B65G 1/137* (2006.01)

(58) Field of Classification Search
USPC .......................................... 700/213–214, 216
See application file for complete search history.

(56) References Cited

U.S. PATENT DOCUMENTS

| | | | |
|---|---|---|---|
| 2014/0124462 | A1 | 5/2014 | Yamashita |
| 2016/0264356 | A1* | 9/2016 | Wakizaka ................ B65G 1/06 |
| 2018/0079626 | A1* | 3/2018 | Brady ....................... B66B 9/00 |
| 2020/0198891 | A1 | 6/2020 | Schack et al. |
| 2020/0277137 | A1* | 9/2020 | Bastian, II .............. B66F 9/065 |

FOREIGN PATENT DOCUMENTS

| | | |
|---|---|---|
| CN | 104029974 | 9/2014 |
| CN | 104444007 | 3/2015 |
| CN | 106044041 | 10/2016 |
| CN | 107000208 | 8/2017 |
| CN | 107472787 | 12/2017 |
| CN | 109153505 | 1/2019 |
| CN | 109987366 | 7/2019 |
| CN | 110062740 | 7/2019 |
| CN | 110143393 | 8/2019 |
| CN | 110723448 | 1/2020 |
| CN | 210028832 | 2/2020 |
| CN | 110949923 | 4/2020 |
| CN | 111846723 | 10/2020 |
| DE | 102006025618 | 11/2007 |
| DE | 102009017241 A1 | 10/2010 |
| DE | 102011106667 | 1/2013 |
| DE | 102012107176 | 2/2014 |
| EP | 2607292 | 6/2013 |
| EP | 2923971 | 9/2015 |
| EP | 2923971 A1 * | 9/2015 ........... B65G 1/0492 |
| JP | 2004123240 | 4/2004 |
| JP | 5988984 B2 | 9/2016 |
| JP | 2017036128 A | 2/2017 |
| WO | WO-2004039700 A1 * | 5/2004 ........... B65G 1/0407 |

OTHER PUBLICATIONS

Extended European Search Report in European Appln No. 21846940. 1, dated Aug. 21, 2023, 13 pages.

* cited by examiner

THREE-DIMENSIONAL WAREHOUSE HANDLING AND DISPATCHING SYSTEM AND METHOD FOR IMPLEMENTING ITEM PICKING

CROSS-REFERENCE TO RELATED APPLICATIONS

This application is a National Stage of International Application No. PCT/CN2021/097977, filed Jun. 2, 2021, which claims priority to Chinese Patent Application No. 202010722774.0, entitled "THREE-DIMENSIONAL WAREHOUSE HANDLING AND DISPATCHING SYSTEM AND METHOD FOR IMPLEMENTING ITEM PICKING" and filed with the China National Intellectual Property Administration on Jul. 24, 2020, the disclosures of which are incorporated herein by reference in their entireties.

TECHNICAL FIELD

The present disclosure relates to the technical field of warehousing and logistics, and in particular, to a three-dimensional warehouse handling and dispatching system and method for implementing item picking.

BACKGROUND

Currently, with the rapid development of the logistics industry, to improve the operating efficiency of a warehouse, an automated handling device such as an automated guided vehicle (AGV) is usually used to implement the automated transportation of items. In addition, because a warehouse area is usually limited, the cost of acquiring and using a land is relatively high. To maximize the space utilization and reduce the operating cost, a dense storage method is also adopted in an existing warehouse for storing items.

In an existing technology, to simultaneously resolve two problems of improving the efficiency of the automated transportation and reducing the cost of dense storage, a four-way shuttle vehicle (referred to as a four-way vehicle below) for a dense storage warehouse and a dedicated warehouse for the operating of the four-way vehicle are designed, as shown in FIG. 1a and FIG. 1b. FIG. 1a is a cross-sectional view of a warehouse. It can be seen that each floor of the warehouse includes a plurality of adjacent storage spaces for storing items, which are interspersed with a plurality of aisles for the four-way vehicle to transport items. In addition, each rack includes a rail for the four-way vehicle to travel, a support for holding a container is arranged in each storage space, and there are uprights shared by the storage spaces for support. FIG. 1b is a top view of a warehouse. It can be seen that the dense stacking of items can save a lot of space. In addition, a relatively small four-way vehicle is capable of flexibly traveling between the storage spaces transports items, and transporting items on containers to a storage space, or transporting items to a docking point of the warehouse for outbound.

However, the four-way vehicle is a high-cost handling device and needs to travel on rails, so that in a warehouse in which the four-way vehicle is used for storing or picking items, the layout of the warehouse is difficult to change flexibly due to the setting of the rails, and the construction and use cost of the warehouse is relatively high.

SUMMARY

A three-dimensional warehouse handling and dispatching system, method, and apparatus for implementing item picking provided in embodiments of this specification are used for partially resolving a problem in the related art that in a dense storage warehouse applying a four-way shuttle vehicle, because rails are required to be arranged on a bottom floor, and only the four-way shuttle vehicle can perform a handling task, the operating cost of the warehouse is relatively high and the warehouse layout cannot be flexibly changed.

The following technical solutions are adopted in the embodiments of this specification:

A three-dimensional warehouse handling and dispatching system is provided in this specification, including: one or more control centers, one or more first handling devices, one or more second handling devices, at least one three-dimensional warehouse, and at least one lifting device, where the at least one three-dimensional warehouse is provided with a plurality of floors, the floors of the three-dimensional warehouse are connected by the at least one lifting device, and the control centers each communicate with the one or more first handling devices and the one or more second handling devices, where: a bottom floor of the three-dimensional warehouse is provided with at least one bottom-floor docking point, at least some bottom-floor storage spaces of the bottom floor are provided with at least one of a container and a container support, and the container support in the bottom-floor storage spaces is configured for placing a container transported by the second handling devices: higher floors of the three-dimensional warehouse other than the bottom floor are each provided with at least one higher-floor docking point, the higher floors are each provided with a rail for the first handling devices to run on, and at least some higher-floor storage spaces of the higher floors are provided with a container; the control centers are each configured to determine, according to a handling task, a first handling device, a second handling device, and a lifting device for performing the handling task, and send a handling instruction for performing the handling task to the first handling device, the second handling device, and the lifting device separately; the first handling device is configured to take a container indicated in the handling instruction out of or put the container indicated in the handling instruction into the higher-floor storage spaces according to the handling instruction sent by the control centers, and transport the container indicated in the handling instruction between the higher-floor storage spaces and the higher-floor docking point; the second handling device is configured to take the container indicated in the handling instruction out of or put the container indicated in the handling instruction into the bottom-floor storage spaces according to the handling instruction sent by the control centers, and transport the container indicated in the handling instruction between the lifting device and the bottom-floor storage spaces and between the bottom-floor storage spaces and the bottom-floor docking point, or between the lifting device and the bottom-floor docking point; and the lifting device is configured to ascend or descend to a specified floor according to the handling instruction sent by the control centers, and transport at least one or a combination of the container indicated in the handling instruction, the first handling device, and the second handling device between the floors.

A three-dimensional warehouse handling and dispatching method is provided in this specification, where: there are at least one or more three-dimensional warehouses, floors of the three-dimensional warehouses are connected by at least one lifting device, a bottom floor of the three-dimensional warehouses is provided with at least one bottom-floor docking point, at least some bottom-floor storage spaces are provided with a container and a container support, the container support in the bottom-floor storage spaces is configured for placing a container transported by a second handling device, higher floors other than the bottom floor of the three-dimensional warehouses are each provided with at least one higher-floor docking point, the higher floors are each provided with a rail for a first handling device to run on, at least some higher-floor storage spaces of the higher floors are provided with a container, and the method includes: determining a to-be-performed handling task: determining, according to the handling task, a first handling device, a second handling device, and a lifting device for performing the handling task; and sending a handling instruction to the determined first handling device, second handling device, and lifting device separately, so that the first handling device, the second handling device, and the lifting device cooperate to transport a container from the higher-floor storage spaces or the bottom-floor storage spaces of the three-dimensional warehouses to the bottom-floor docking point, or transport a container at the bottom-floor docking point into the higher-floor storage spaces or the bottom-floor storage spaces of the three-dimensional warehouses.

At least one technical solution adopted in the embodiments of this specification can achieve the following beneficial effects: through a combination of using first handling devices and second handling devices in a three-dimensional warehouse, a handling function of a lifting device in the three-dimensional warehouse is used, so that the first handling devices and the second handling devices can cooperate to transport items in a dense storage warehouse, which avoids laying rails on a bottom floor of the warehouse. The layout of the warehouse can be changed flexibly, a quantity of first handling devices required can be reduced, the operating cost of the warehouse can be reduced, and the transport efficiency can be improved.

BRIEF DESCRIPTION OF THE DRAWINGS

To describe the technical solutions in the embodiments of the present disclosure more clearly, the following briefly describes the accompanying drawings required to be used in the embodiments. The accompanying drawings herein, which are incorporated in the specification as a part of the specification, show embodiments in accordance with the present disclosure, and together with the specification are used for describing the technical solutions of the present disclosure. It should be understood that, the following accompanying drawings show only some embodiments of the present disclosure, which cannot be considered as limitation on the scope. A person of ordinary skill in the art may still derive other accompanying drawings from the accompanying drawings without creative efforts.

DETAILED DESCRIPTION

To clearly state the objectives, technical solutions, and advantages of this specification, the technical solutions of the present disclosure are clearly and completely described below with reference to specific embodiments of this specification and corresponding accompanying drawings. Apparently, the described embodiments are only some embodiments rather than all the embodiments of the present disclosure. All other embodiments obtained by a person of ordinary skill in the art based on the embodiments of this specification without creative efforts shall fall within the protection scope of the present disclosure.

The technical solutions provided in the embodiments of the present disclosure are described in detail below with reference to the accompanying drawings.

Figure 1A:
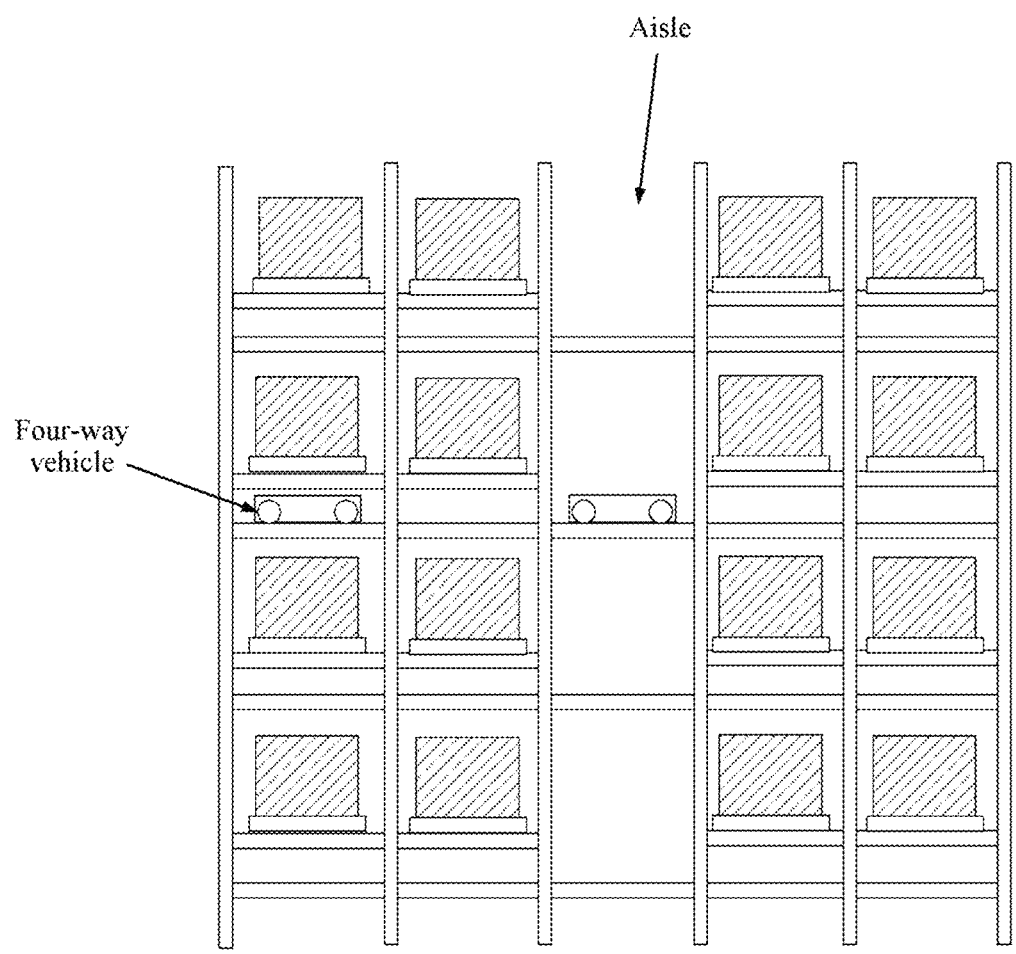
FIG. 1a is a schematic structural diagram of a cross-sectional view of an existing warehouse.
Figure 1B:
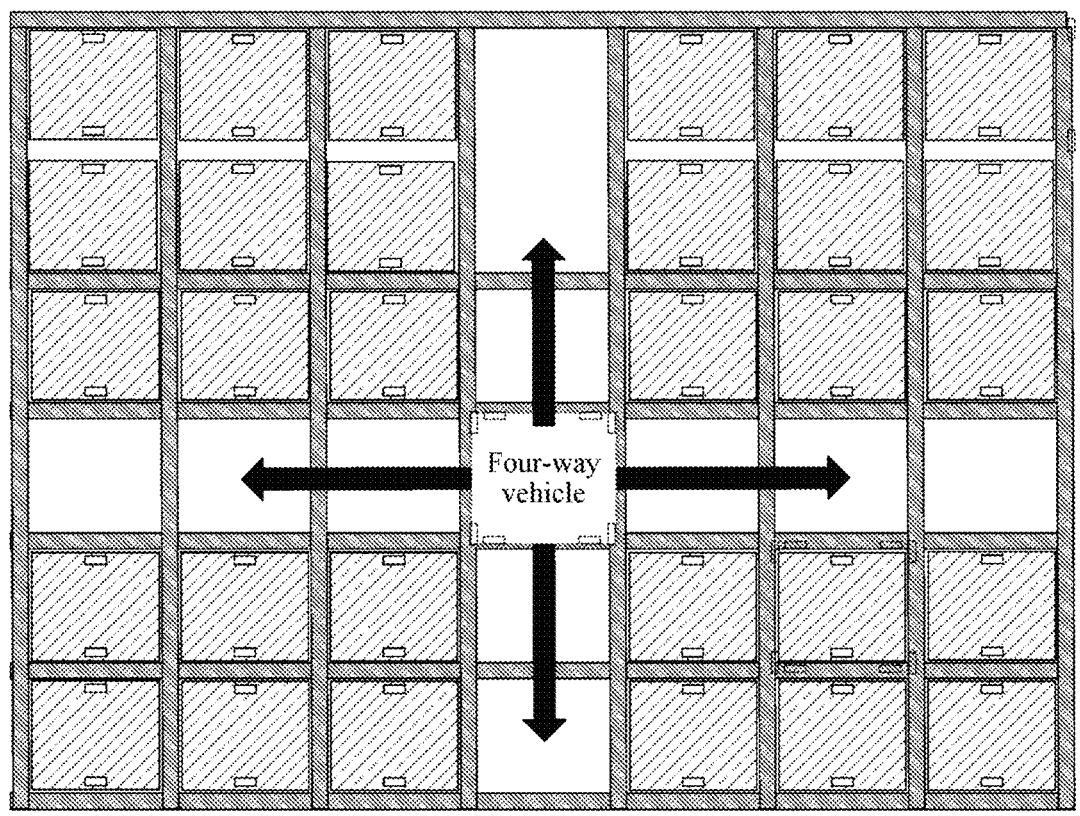
FIG. 1b is a schematic structural diagram of a top view of an existing warehouse.
Figure 2:
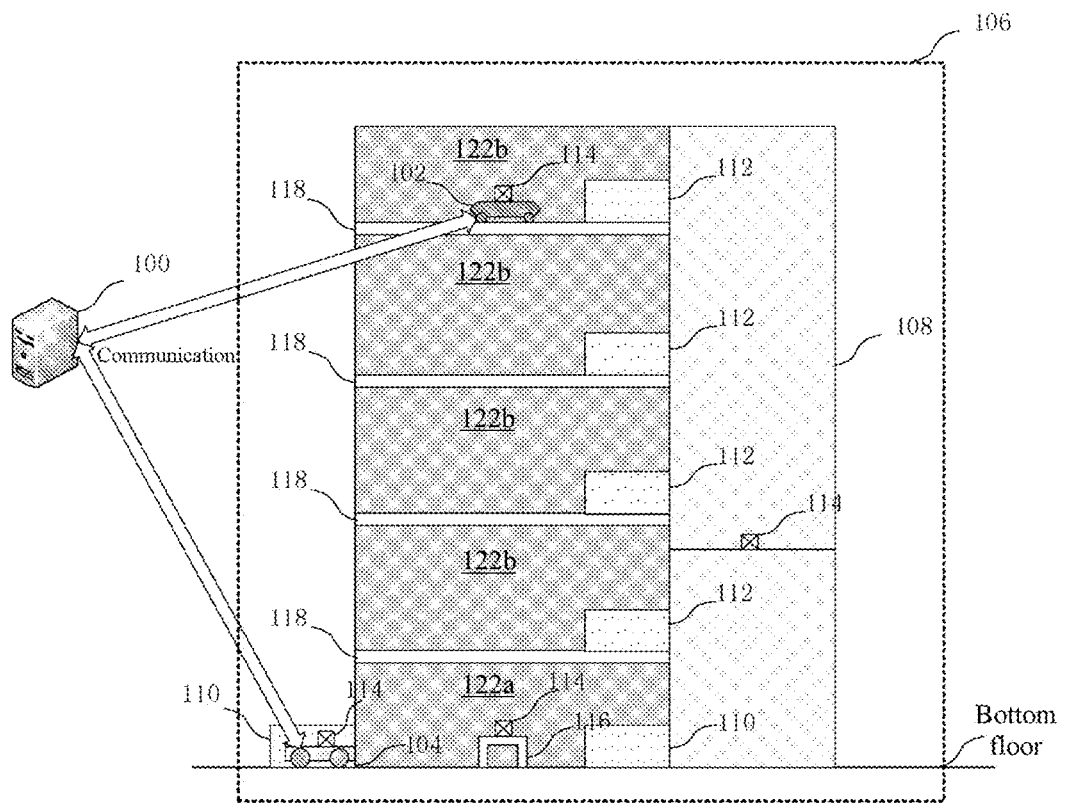
FIG. 2 is a schematic diagram of a three-dimensional warehouse handling and dispatching system for implementing item picking according to an embodiment of this specification.

FIG. 2 is a schematic diagram of a three-dimensional warehouse handling and dispatching system for implementing item picking according to an embodiment of this specification, and the system includes: one or more control centers 100, one or more first handling devices 102, one or more second handling devices 104, at least one three-dimensional warehouse 106, and at least one lifting device 108, where the at least one three-dimensional warehouse 106 is provided with a plurality of floors, the floors of the three-dimensional warehouse 106 are connected by the at least one lifting device 108, and the control centers 100 each communicate with the one or more first handling devices 102 and the one or more second handling devices 104. The three-dimensional warehouse 106 may be divided into a bottom floor and a plurality of higher floors. Storage spaces 122 arranged on the bottom floor are bottom-floor storage spaces 122a, and storage spaces arranged on the higher floors are higher-floor storage spaces 122b. For the convenience of understanding, only one control center 100 and one three-dimensional warehouse 106 are included in FIG. 2.

An objective of storing items in a warehouse is to store a variety of items in large quantities in a centralized manner, for example, to facilitate the selection of required items according to the needs of an order. In a system provided in this specification, items in a three-dimensional warehouse are carried by a container, and the container needs to be transported by a first handling device 102, a second handling device 104, and a lifting device 108. Therefore, a handling task in this specification is also for implementing item selection, and can be determined by a control center 100 according to the order.

Specifically, when sorting items in a three-dimensional warehouse, it is necessary to first determine storage spaces 122 of the items according to items that need to be sorted. Then, a handling task is performed through devices, so that the items are delivered to a sorting area and sorted. Afterwards, the remaining items are stored in the warehouse after the sorting is completed. As such, the sorting of the items is implemented. Therefore, the handling task in this specification is a task of transporting a container carrying items, which is performed in order to implement the sorting of the items.

During the sorting of items, the control center 100 is configured to determine, according to a received order, storage spaces 122 of items included in the order, then determine a path from the storage spaces 122 to a bottom-floor docking point 110, determine, according to the path, a first handling device 102, a second handling device 104, and a lifting device 108 for performing a handling task, and send a handling instruction for performing the handling task to the first handling device 102, the second handling device 104, and the lifting device 108 separately. After the items are sorted in a sorting area, the control center 100 may then determine a path from the bottom-floor docking point 110 to the storage spaces 122, according to the bottom-floor docking point 110 at which a container is located and positions of the storage spaces 122 in which the items need to be stored. The control center 100 can then determine, according to the path, a first handling device 102, a second handling device 104, and a lifting device 108 for performing a handling task. The control center 100 can send a handling instruction for performing the handling task to the first handling device 102, the second handling device 104, and the lifting device 108 separately. After a process described above, a three-dimensional warehouse completes the sorting of items.

Additionally, it should be further noted that the three-dimensional warehouse and related methods for implementing item picking in this specification are not only applicable to the picking of commodity items in a warehousing scenario, but also applicable to the picking of finished products, semi-finished products, or semi-processed items in a factory production scenario, and the picked items are used for implementing a specific production link or a specific production node. The application scenario of item picking is not specifically limited in this specification. Therefore, in this specification, a bottom floor of a three-dimensional warehouse 106 is provided with at least one bottom-floor docking point 110. At least some bottom-floor storage spaces 122*a* of the bottom floor are provided with at least one of a container 114 and a container support 116. The container support 116 in the bottom-floor storage spaces 122*a* is configured for placing a container 114 to be transported by a second handling device 104. The container support 116 may be mounted in the bottom-floor storage spaces 122*a* or removed from the bottom-floor storage spaces 122*a* as required. In a case that different bottom-floor storage spaces 122*a* are selected for mounting the container support 116, the container support may be have different areas for placing the containers 114. A space between the areas in which the container 114 is placed may be used as an aisle for the second handling device 104 carrying the container 114 to pass through. The container support 116 is used for the second handling device 104 to place the container 114. The second handling device 104 can place the container 114 including items on the container support 116 in the bottom-floor storage spaces 122*a*, so as to store the items into the warehouse.

In addition, the bottom-floor docking point 110 of the three-dimensional warehouse 106 is a docking point outside the three-dimensional warehouse 106. For example, a forklift or another handling device may take the container 114 that need to be transported out of the warehouse from the bottom-floor docking point 110, or bring the container 114 that need to be stored into the warehouse to the bottom-floor docking point 110. After the container 114 enters the bottom-floor docketing point 110, at least one of the first handling device 102, the second handling device 104, and the lifting device 108 transports the container 114 from the bottom-floor docking point 110 into a storage space 122, according to the handling instruction sent by the control center 100.

In this specification, the container 114 is configured to carry items, but the specific form of the container 114 is not limited in this specification. For example, the container 114 may be a tray, a box, or the like, as long as it can accommodate or support items.

In addition, higher floors of the three-dimensional warehouse 106 other than the bottom floor are each provided with at least one higher-floor docking point 112. The higher floors are each provided with a rail 118 for the first handling device 102 to run on. At least some higher-floor storage spaces 122*b* of the higher floors are provided with the container 114. A structure configured for holding the container 114, such as a support rod, a tray, or the like, is arranged in each of the higher-floor storage spaces 122*b* of the higher floors.

Further, in this specification, the container 114 arranged on each floor of the three-dimensional warehouse 106 may include items stored in the warehouse or other idle containers 114. An occupancy rate of each floor may be configured as required. The occupancy rate of a floor is a ratio of a quantity of storage spaces 122 having a container 114 to a quantity of total storage spaces 122 of the floor. An occupancy rate of a higher floor may be set between 0 and 100%, and an occupancy rate of the bottom floor may be set between 0 and 100%.

Still further, due to warehouse structures such as reinforcing ribs and beams in the three-dimensional warehouse 106, also due to some storage spaces 122 are already occupied with containers 114, the first handling device 102 or the second handling device 104 cannot directly travel from one storage space 122 to an adjacent storage space 122 when carrying the container 114. Therefore, each floor of the three-dimensional warehouse 106 is provided with an aisle for the first handling device 102 or the second handling device 104 carrying the container 114 to pass through.

Figure 3:
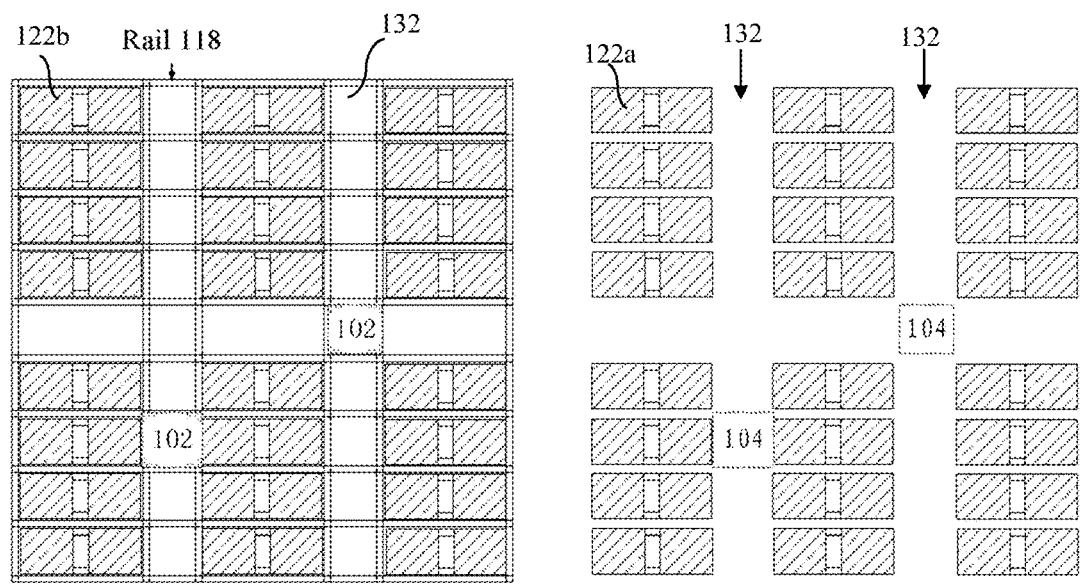
FIG. 3 is a schematic diagram of a top view of a three-dimensional warehouse according to an embodiment of this specification.

FIG. 3 provided in this specification is a schematic diagram of a top view of a three-dimensional warehouse. The left side of FIG. 3 is a schematic diagram of higher floors, and it can be seen that the higher floors include rails 118 on which the first handling device 103 may travel. The right side of FIG. 3 is a schematic diagram of a bottom floor, and it can be seen that the bottom floor does not include rails 118. Moreover, it can be seen from the top view that each floor of the three-dimensional warehouse 106 is provided with aisles 132 for the first handling device 102 or the second handling device 104 to pass through.

Figure 4A:
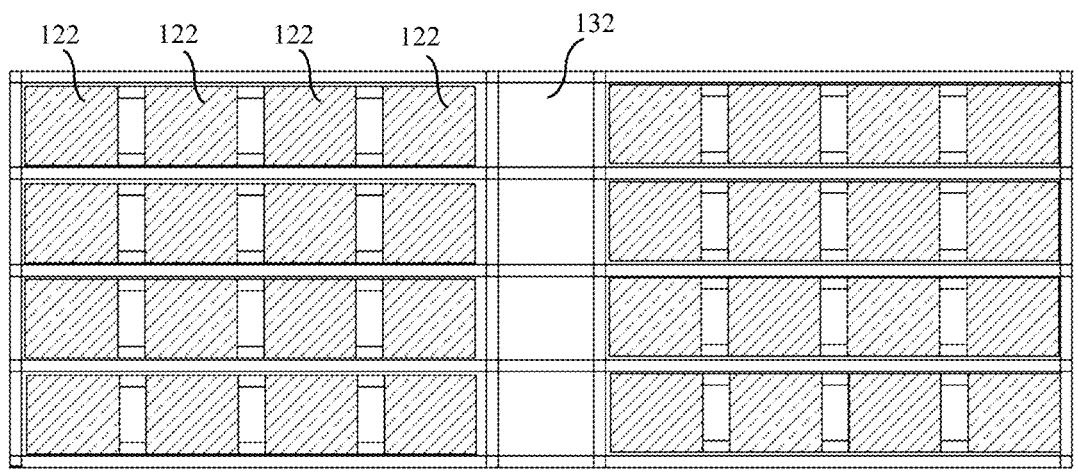
FIG. 4a and FIG. 4b are schematic diagrams of warehouse layouts according to an embodiment of this specification.

In addition, it should be noted that in this specification, layouts of aisles 132 of different floors may not be the same, and may be set as required. In a dense storage warehouse, in some cases, in order to transport items in storage spaces 122 that are not adjacent to an aisle, items in storage spaces 122 adjacent to the aisle need to be moved away first to make space for transporting items in storage spaces that are not adjacent to the aisle. In this case, the storage spaces 122 adjacent to the aisle can be used as a temporary aisle. Therefore, usually for the consideration of transport efficiency, a stock keeping unit (SKU) of items stored in a storage space not adjacent to an aisle is the same as an SKU of items stored in the storage spaces adjacent to the aisle. In this case, a layout of storage spaces 122 and aisles 132 in a warehouse is as follows: in a horizontal direction, 1 aisle, 4 storage spaces, and 1 aisle are arranged in sequence, as shown in FIG. 4a. That is, four columns of storage spaces 122 are arranged between two aisles 132, which can increase the storage density of items without affecting the operating efficiency of the warehouse.

However, in a case that the SKU of items in adjacent storage spaces are different, e.g., there are not enough items under the same SKU to occupy two or more storage spaces, a layout shown in FIG. 4a may affect the operating efficiency of the warehouse. Therefore, a layout shown in FIG. 4b may usually be used, that is, the layout of storage spaces 122 and aisles 132 in the warehouse is: in a horizontal direction, 1 aisle, 2 storage spaces, and 1 aisle are arranged in sequence. That is, two columns of storage spaces 122 are arranged between two aisles 132.

Figure 4B:
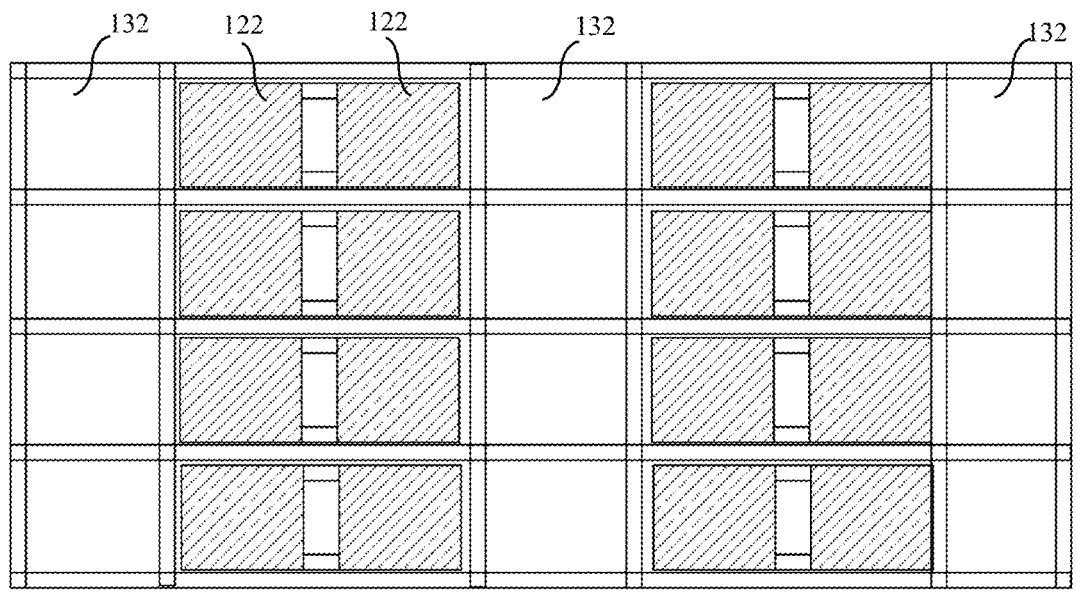

In this specification, each floor of the three-dimensional warehouse may adopt the layout shown in FIG. 4a or FIG. 4b or a combination of the two layouts, which is not limited in this specification. Moreover, according to the storage needs, each floor may adopt different layouts. For example, bulky commodities that take up a lot of space are stored on a floor A. As bulky commodities can occupy a storage space 122 by a small quantity of commodities, commodities under the same SKU may occupy two or more storage spaces. Therefore, the floor A may all adopt the layout of FIG. 4a. Small commodities are stored on a floor A+1, then the floor A+1 may all adopt the layout of FIG. 4b.

In this specification, the first handling device 102 may be specifically a handling device traveling on a rail, such as a four-way shuttle, and the second handling device 104 may be specifically a handling device traveling on a plane, such as an AGV. Certainly, the specific forms of the first handling device 102 and the second handling device 104 are not limited in the present disclosure. The first handling device 102 and the second handling device 104 can be set as required, as long as the first handling device 102 can travel along a rail and transport the container 114 in the higher-floor storage spaces 122b, and the second handling device 104 can travel on the bottom floor and transport the container 114 in the bottom-floor storage spaces 122a.

When a control center 100 determines a to-be-performed handling task according to an order, the control center 100 may first determine the to-be-performed handling task. The control center 100 can then determine, according to the handling task, a first handling device 102 for performing the handling task, and send a handling instruction to the first handling device 102.

Then, the first handling device 102 may take a container 114 indicated in the handling instruction out of or into a higher-floor storage space 122b according to the handling instruction sent by the control center 100, and transport the container 114 between the higher-floor storage spaces 122b and a higher-floor docking point 112.

A second handling device 104 may take out a container 114 indicated in the handling instruction or put the container 114 into a bottom-floor storage space 122a according to the handling instruction sent by the control center 100. The second handling device 104 can transport the container 114 indicated in the handling instruction between a lifting device 108 and the bottom-floor storage spaces, between the bottom-floor storage spaces 122a and a bottom-floor docking point 110, or between the lifting device 108 and the bottom-floor docking point 110. A bottom surface of the three-dimensional warehouse 106 is a plane on which the second handling device 104 travels. Specifically, the bottom surface may be a ground on which the three-dimensional warehouse 106 is located, or a platform provided on the bottom floor of the three-dimensional warehouse 106 for the second handling device 104 to travel on. For example, the bottom surface can be a steel platform on the bottom floor of the three-dimensional warehouse 106 for the second handling device 104 to travel on.

The lifting device 108 is configured to ascend or descend to a specified floor according to the handling instruction, and transport at least one or a combination of the container indicated in the handling instruction, the first handling device, and the second handling device between floors.

The specified floor is a floor that the lifting device 108 performing the handling task needs to reach, for example, the container 114 is transported from a third floor to the bottom floor. Then, the control center 100 may separately send two handling instructions to the lifting device 108, the lifting device 108 reaches the third floor according to a first handling instruction (that is, a specified floor indicated in the handling instruction received for the first time), and when the container 114 has been transported into the lifting device 108, the lifting device 108 may reach the bottom floor according to a second handling instruction (that is, a specified floor indicated in the received handling instruction for the second time). Certainly, the foregoing is only an example. Alternatively: the control center 100 may send only one handling instruction. Then, the specified floor is separately the third floor and the bottom floor in order, so that the lifting device 108 reaches the third floor and the bottom floor in sequence, according to the handling instructions, and transports a container 114 of the third floor to the bottom floor.

In addition, in this specification, at least some higher-floor storage spaces 122b of the higher floors are further provided with a container support 114 configured for placing the container. The container support 114 is the same as the container support 114 arranged in the bottom-floor storage spaces 122a described above, the specific arrangement has been described, and details are not described herein again.

In addition, in this specification, a distance between the container support 116 arranged in the higher-floor storage spaces 122b (or a structure for placing the container 114 in the higher-floor storage spaces 122b) and a rail 118 is greater than a height of the first handling device 102 not carrying the container 114. As such, the first handling device 102 can travel to below the higher-floor storage spaces, and transport the container 114 from below the higher-floor storage spaces 122b in a piggyback manner and leave the higher-floor storage spaces.

In an embodiment provided in this specification, taking a process of transporting the container 114 from a higher-floor storage space 122b to the bottom-floor docking point 110 for item outbound as an example, a process that a handling and dispatching system of a three-dimensional warehouse performs a handling task is described as follows.

After determining that items located in higher-floor storage spaces 122b need to be transported to a bottom-floor docking point 110 for outbound, a control center 100 of the three-dimensional warehouse handling and dispatching system determines, according to a to-be-performed handling task, first handling devices 102 of floors on which the higher-floor storage spaces 122b are located.

Then, the control center 100 selects a first handling device 102 for performing the handling task from the determined first handling devices 102, and sends a handling instruction to the selected first handling device 102. The control center 100 may select, the first handling device 102 according to whether the first handling devices 102 are idle or a quantity of to-be-executed handling instructions.

Certainly: the policy adopted to select the first handling device 102 is not limited in the present disclosure, and can be set as required. For example, the control center 100 may simply select any one of the idle first handling devices 102 as the first handling device 102 for performing the handling task. Or, the control center 100 can select a first handling device 102 closest to the higher-floor storage spaces 122b in which the items of the handling task are located.

In addition, when sending a handling instruction to the first handling device 102, the control center 100 may also send a handling instruction to a lifting device 108 asynchronously, so that the lifting device 108 ascends or descends to a floor on which the higher-floor storage spaces 122b are located (that is, the specified floor), that is, a floor on which a container 114 of the handling task is located. Then, the lifting device 108 may move to the floor according to the handling instruction, wait for the first handling device 102 to transport the container 114 to a higher-floor docking point 112, and receive the container 114 through the higher-floor docking point 112. It should be noted that, in this specification, handling instructions sent by the control center 100 to different handling devices are not the same.

Then, the first handling device 102 travels through an aisle of the located floor to below the higher-floor storage spaces 122b in which the container 114 of the handling task is located. The first handling device 102 then transports the container 114 in the higher-floor storage spaces 122b in a piggyback manner, travels through the aisle of the floor again to the higher-floor docking point 112 of the located floor, and places the container 114 into the lifting device 108 through the higher-floor docking point 112. After placing the container 114, the first handling device 102 sends information that the handling instruction is executed to the control center 100.

It should be noted that the handling instruction sent to the first handling device 102 includes identifiers of the higher-floor storage spaces 122b requiring transport, an identifier of the higher-floor docking point 112, and a path from the higher-floor storage spaces 122b to the higher-floor docking point 112. In a case that the three-dimensional warehouse 106 includes a plurality of higher-floor docking points 112, the control center 100 may determine identifiers and paths of the higher-floor docking points 112 through path optimization as information included in a first handling instruction. The control center 100 can send the information to the first handling device 102, so that the first handling device 102 transports the container 114 to the higher-floor docking point 112 according to the optimized path.

According to the information that the handling instruction is executed sent by the first handling device 102, the control center 100 determines that the lifting device 108 has obtained the container 114 through the higher-floor docking point 112, and sends a handling instruction to the lifting device 108. The handling instruction includes a specified floor to be reached by the lifting device 108 next, and in this example, the specified floor is a bottom floor.

Then, the lifting device 108 may transport the currently transported container 114 to the bottom floor of the three-dimensional warehouse 106, according to the handling instruction sent again by the control center 100. The lifting device 108 can send information that the handling instruction is executed to the control center 100.

The control center 100 determines, according to the information that the handling instruction is executed sent by the lifting device 108, that the container 114 has been transported to the bottom floor. The control center 100 can then select a second handling device 104 for performing the handling task from second handling devices 104, and send a handling instruction to the selected second handling device 104. The logic for selecting the second handling device 104 from the second handling devices 104 may be the same as the logic for selecting the first handling device 102 from the first handling devices 102, and details are not described herein again in this specification.

The second handling device 104 travels through an aisle of the bottom floor to the lifting device 108 according to the handling instruction sent by the control center 100, and transports the container 114 transported by the lifting device 108. The second handling device 104 then travels through the aisle of the bottom floor again to the bottom-floor docking point 110, places the container at the bottom-floor docking point 110, and sends information that the handling instruction is executed to the control center 100.

Finally, the control center 100 may determine that the handling task is performed according to completed information sent by the second handling device 104.

A container support 116 may also be arranged at the bottom-floor docking point 110. The container support 116 may be a conveyor and may be connected to a conveyor line, so that items transported by the second handling device 104 to the bottom-floor docking point 110 can be transported to a specified area (for example, a picking area or a packing area) along the conveyor line.

Finally, after receiving information that a third handling instruction is executed, the control center 100 determines that the items are correctly transported to the bottom-floor docking point 110, and the handling task is completed.

In another embodiment of this specification, in a case that items that need to be delivered are located in bottom-floor storage spaces, the control center 100 may select a second handling device 104 for performing the handling task from the second handling devices 104, and send a handling instruction to the determined second handling device 104.

The second handling device 104 travels through the aisle of the bottom floor to the bottom-floor storage spaces 122a according to the received handling instruction, and transports a container 114 stored in the bottom-floor storage spaces.

Then, the second handling device 104 travels through the aisle of the bottom floor again to the bottom-floor docking point 110, places the container at the bottom-floor docking point 110, and sends information that the handling instruction is executed to the control center 100.

Finally, after receiving the information that the handling instruction is executed sent by the second handling device 104, the control center 100 determines that the container 114 is correctly transported to the bottom-floor docking point 110, and the handling task is completed.

In an embodiment provided in this specification, taking a process of transporting a container 114 from a bottom-floor docking point 110 into any one of higher-floor storage spaces 122b for inventory as an example, a process in which a three-dimensional warehouse handling and dispatching system for implementing item picking performs a handling task is described.

First, according to the to-be-performed handling task, and when determining that a container 114 that has been transported to the bottom-floor docking point 110 needs to be transported to the higher-floor storage spaces 122b for inventory, a control center 100 of the system may first select a second handling device 104 for performing the handling task from second handling devices 104, and send a handling instruction to the selected second handling device 104. Certainly, for the logic for determining the second handling device 104 for performing the handling task, details are not described in this specification.

Then, the second handling device 104 travels through, according to the received handling instruction, an aisle of a bottom floor to the bottom-floor docking point 110 to transport the container 114. The second handling device 104 then travels through the aisle of the bottom floor again to a lifting device 108, and places the container on the lifting device 108. After placing, the second handling device 104 sends information that the handling instruction is executed to the control center 100.

In addition, when sending the handling instruction to the second handling device 104, the control center 100 may also send a handling instruction to the lifting device 108 asynchronously, so that the lifting device 108 moves to the bottom floor (that is, a specified floor), that is, a floor on which the bottom-floor docking point 110 is located. Then, the lifting device 108 may move to the bottom floor according to the handling instruction, and wait for the second handling device 104 to transport the container 114 to the lifting device 108.

After receiving information that the handling instruction is executed sent by the second handling device 104, the control center 100 may continue to send a handling instruction to the lifting device 108 according to the information that the handling instruction is performed and a floor on which higher-floor storage spaces 122b for storing the items are located included in the handling task. The specified floor corresponding to the handling instruction is the floor on which the higher-floor storage spaces 122b for storing the items are located.

The lifting device 108 transports, according to the received handling instruction sent by the control center 100 again, the container 114 to the floor on which the higher-floor storage spaces 122b are located, and sends information that the handling instruction is executed to the control center 100. In addition, when the lifting device 108 reaches the specified floor, the container 114 may further be transported out of the lifting device 108 through the higher-floor docking point 112.

The control center 100 selects, according to the information that the handling instruction is executed sent by the lifting device 108, a first handling device 102 for performing the handling task from first handling devices 102 on the floor on which the higher-floor storage spaces 122b are located, and sends a handling instruction to the determined first handling device 102.

The first handling device 102 travels to the higher-floor docking point 112 through an aisle of the located floor according to the received handling instruction, transports the container 114 lifted from the bottom floor by the lifting device 108. The first handling device 102 then travels through the aisle of the located floor again to below the higher-floor storage spaces, and places the container 114 into the higher-floor storage spaces.

Finally, after placing the container 114, the first handling device 102 may send information that the handling instruction is executed to the control center 100. After receiving the information that the handling instruction is executed sent by the first handling device 102, the control center 100 determines that the container 114 is correctly transported to the higher-floor storage spaces, and the handling task is performed.

Further, in this specification, the first handling device 102 may use various methods for transporting the container 114 out of or storing the container 114 into the higher-floor storage spaces.

Specifically, the control center 100 determines, according to the handling task, the higher-floor storage spaces 122b corresponding to the handling task. For example, higher-floor storage spaces 122b for storing the container 114 may be considered as the higher-floor storage spaces 122b corresponding to the handling task, or higher-floor storage spaces 122b determined when the container 114 is stored for inventory may also be considered as the higher-floor storage spaces 122b corresponding to the handling task.

Then, the control center 100 may send a handling instruction to the determined first handling device 102 according to positions of the higher-floor storage spaces 122b and positions of aisles 132 adjacent to the higher-floor storage spaces.

Figure 5:
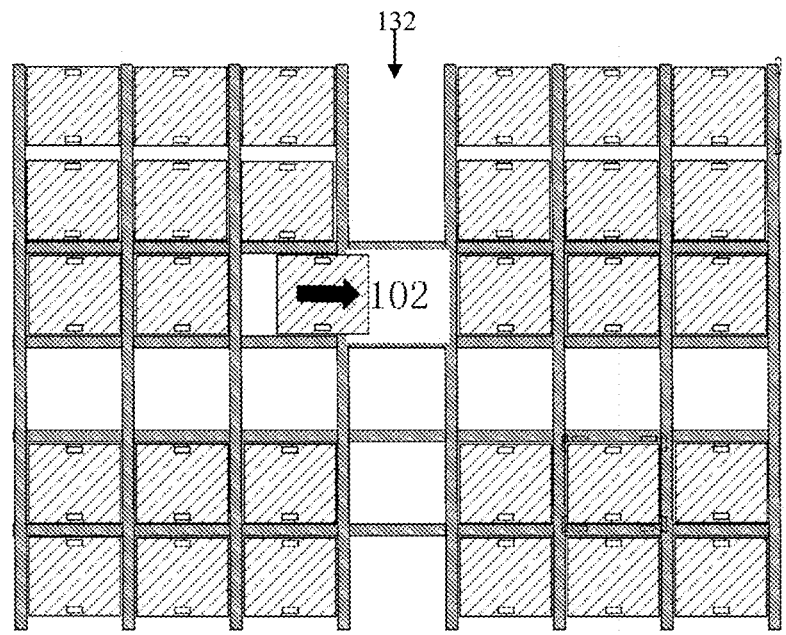
FIG. 5 is a schematic diagram of a first handling device picking and placing a container from a side according to an embodiment of this specification.

Then, the first handling device 102 may, at a rail position adjacent to the higher-floor storage spaces, take out the container 114 from a side of the higher-floor storage spaces 122b according to the handling instruction sent by the control center 100 to the first handling device 102, or put the transported container 114 in the first handling device 102 into the higher-floor storage spaces 122b from the side of the higher-floor storage spaces. As shown in FIG. 5. FIG. 5 is a schematic diagram of a first handling device picking and placing a container from a side provided in this specification. The first handling device 102 is located at an aisle 132 position adjacent to a higher-floor storage space, and picks and places items from the side of the higher-floor storage space.

Alternatively, after determining the higher-floor storage spaces corresponding to the handling task, the control center 100 sends a handling instruction to the determined first handling device 102 according to positions of the higher-floor storage spaces and positions of other storage spaces above the higher-floor storage spaces.

Then, the first handling device 102 may take out the container 114 from above the higher-floor storage spaces into the first handling device 102 according to the handling instruction sent by the control center 100. Or, the first handling device 102 may put the container 114 in the first handling device 102 into the higher-floor storage spaces from above the higher-floor storage spaces.

Still further, in this specification, the second handling device 104 may also use various methods for transporting the container 114 out of or storing the container 114 into the bottom-floor storage spaces.

Specifically, the control center 100 determines, according to the handling task, the bottom-floor storage spaces corresponding to the handling task. For example, bottom-floor storage spaces for storing the container 114 may be considered as the bottom-floor storage spaces corresponding to the handling task, or bottom-floor storage spaces determined when the container 114 is stored for inventory may also be considered as the bottom-floor storage spaces corresponding to the handling task.

Then, the control center 100 may send a handling instruction to the determined second handling device 104 according to positions of the bottom-floor storage spaces and positions of aisles 132 adjacent to the bottom-floor storage spaces.

Then, the second handling device 104 may, at an aisle 132 position adjacent to the bottom-floor storage spaces, take out the container 114 from a side of the bottom-floor storage spaces according to the handling instruction sent by the control center 100 to the second handling device 104, or put the transported container 114 in the second handling device 104 into the bottom-floor storage spaces from the side of the bottom-floor storage spaces.

Alternatively, after determining the bottom-floor storage spaces corresponding to the handling task, the control center 100 sends a handling instruction to the determined second handling device 104 according to the positions of the bottom-floor storage spaces.

Then, the second handling device 104 may, at an aisle 132 position adjacent to the bottom-floor storage spaces, enter to below the bottom-floor storage spaces according to the handling instruction sent by the control center 100, and take out the container 114 from below the bottom-floor storage spaces to the second handling device 104. Or the first handling device 102 may place the container 114 indicated in the handling instruction in the second handling device 104 into the bottom-floor storage spaces.

In addition, in this specification, because for each three-dimensional warehouse 106, at least one lifting device 108 may be arranged in the three-dimensional warehouse 106, to allow the container 114 to be placed on any floor of the three-dimensional warehouse 106. In a case that the three-dimensional warehouse 106 includes a plurality of lifting devices 108, at least an overlap exists between specified floors reachable by the plurality of lifting devices 108.

Figure 6:
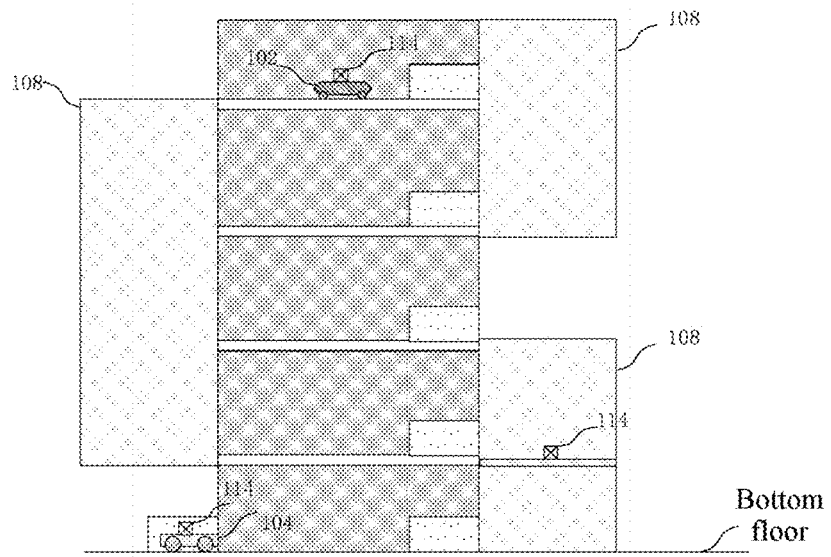
FIG. 6 is a schematic diagram of a distribution of a lifting device according to an embodiment of this specification.

That is, through the overlapping floors, the lifting devices 108 can connect floors of the three-dimensional warehouse 106. As shown in FIG. 6, the three-dimensional warehouse 106 includes a total of four floors, and three lifting devices 108 respectively communicating a bottom floor and a first floor, the first floor and a second floor, and the second floor and a third floor. Certainly, the lifting device 108 may be located at different positions of the three-dimensional warehouse 106.

A control center 100 may transport a container to any floor of the three-dimensional warehouse 106 through one or more lifting devices 108. For example, in FIG. 6 described above, in a case that items on the third floor need to be transported to the bottom floor, the control center may dispatch first handling devices 102 and corresponding lifting devices 108 of the first to third floors respectively, so that the lifting devices 108 and the first handling devices 102 on the floors transport the items from the third floor to the bottom floor in a relay manner.

Figure 7:
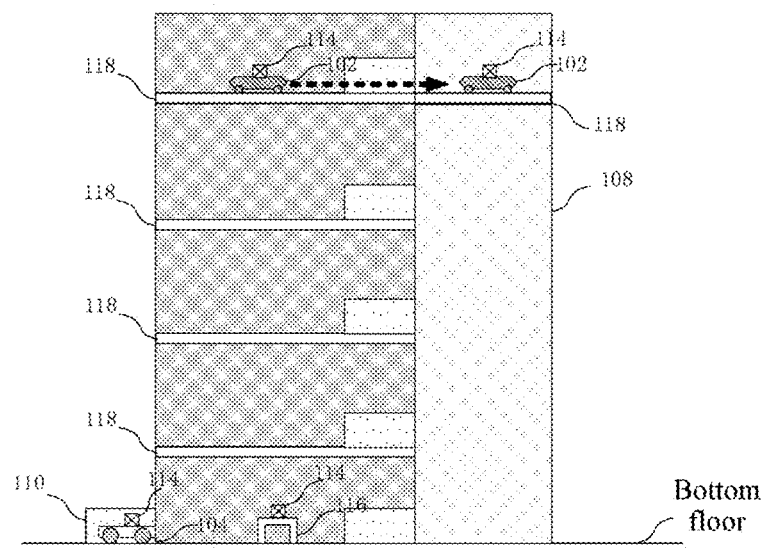
FIG. 7 is a schematic diagram of arranging a rail in a lifting device of a three-dimensional warehouse according to an embodiment of this specification.

In this specification, rails 118 may be arranged in the lifting devices 108, so that the rails 118 in the lifting devices 108 can be connected to rails 118 arranged in higher floors of the three-dimensional warehouse 106. Then, when moving along the rails on the higher floors, the first handling devices 102 may travel into the lifting devices 108, and directly place the container 114 into the lifting devices 108, or the first handling devices 102 may be transported by the lifting devices 108 to other floors, as shown in FIG. 7.

Still further, in this specification, in a case that rails 118 are also arranged in the lifting devices 108, the control center 100 may also dispatch the first handling devices 102 between different floors through the lifting devices 108.

Specifically, in this specification, the control center 100 may determine, according to a to-be-performed handling task corresponding to some or all of the higher floors, a quantity of first handling devices 102 required by the higher floors. The control center 100 may determine a floor on which higher-floor storage spaces involved in the handling task are located as a higher floor corresponding to the handling task. For example, in a case that in a handling task A, a container 114 needs to be transported from the third floor, then the third floor is a higher floor corresponding to the handling task A. In a case that in a handling task B, a container 114 needs to be transported to a specific higher-floor storage space of the third floor, then the third floor is a higher floor corresponding to the handling task B. In addition, the control center 100 may determine, according to a quantity of to-be-performed handling tasks corresponding to the higher floors, the quantity of first handling devices 102 required by the higher floors. In a case that there are more to-be-performed handling tasks corresponding to the higher floors, the quantity of first handling devices 102 required by the higher floors is more. Certainly, due to a limited space of each floor in the warehouse, an excessive quantity of first handling devices 102 may result in a reduction in travel paths for devices or congestion in paths. Therefore, in this specification, the control center 100 may also determine, according to a preset maximum quantity of first handling devices 102 of each higher floor, the quantity of first handling devices 102 required by the higher floors. The maximum quantity of first handling devices 102 may vary according to the layout of each floor. In a case that a quantity of containers 114 arranged in the higher floors is less, it means that a quantity of areas through which the first handling devices 102 can pass is greater.

Then, the control center 100 may determine, according to the quantity of first handling devices 102 required by the each of the higher floors and a current quantity of first handling devices 102 of the each of the higher floors, first handling devices 102 that need to be dispatched to the each of the higher floors. The control center 100 may send a dispatching instruction to the first handling devices 102 that need to be dispatched.

Then, the first handling devices 102 are further configured to travel into the lifting devices 108 along the rails 118 according to the received dispatching instruction sent by the control center 100, and reach a higher floor specified in the dispatching instruction through the lifting devices 108.

In addition, in the description of the structure of the three-dimensional warehouse 106 described above in this specification, higher-floor docking points 112 respectively set on the higher floors are independent of the lifting devices 108. This is because if the first handling devices 102 cannot reach the lifting devices 108, a container 114 needs to be transported to the lifting devices 108 through the higher-floor docking points 112, and then the lifting devices 108 transport the container 114 to a specified floor.

However, if rails 118 are also arranged in the lifting devices 108 and the first handling devices 102 can travel into the lifting devices 108, the higher-floor docking points 112 may alternatively be set in the lifting devices 108 in this specification.

Then, the first handling devices 102 are further configured to travel to the higher-floor docking points 112 in the lifting devices 108 according to a handling instruction sent by the control center 100. The first handling devices 102 can place the container 114 at the higher-floor docking points 112, or take out the container 114 from the higher-floor docking points 112.

Figure 8:
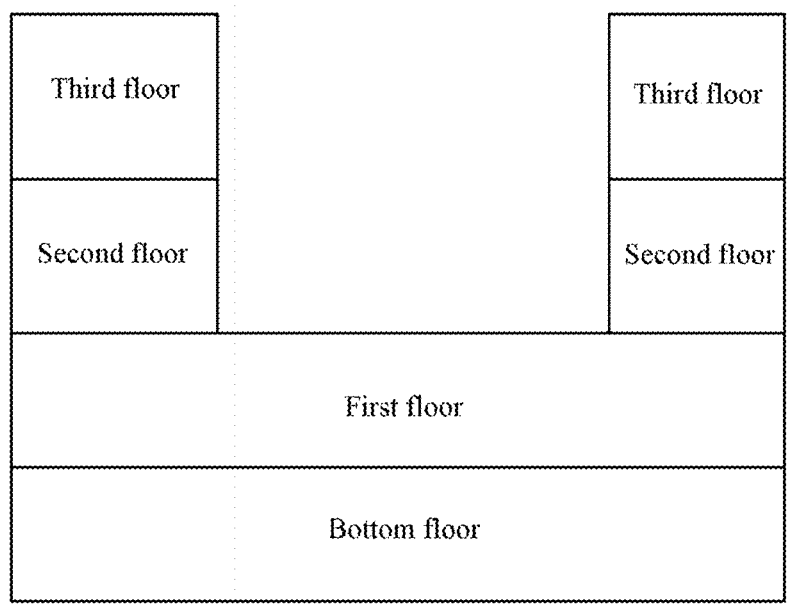
FIG. 8 is a schematic diagram of areas of a three-dimensional warehouse that are not connected according to an embodiment of this specification.

Further, in this specification, because the construction of a warehouse may be affected by various aspects, the layout of floors may be different. In a case that there is a floor where not all areas are connected by rails among the higher floors of the three-dimensional warehouse 106, as shown in FIG. 8, if a first handling device 102 needs to be dispatched between two areas, the control center 100 may be configured to:

for the floor where not all areas are connected by rails 118, in a case that a first handling device 102 needs to be dispatched between different areas of the floor, determine an area from which the first handling device 102 is to be dispatched as a departure area, and determine an area into which the first handling device 102 is to be dispatched as a destination area, and determine another floor closest to the floor where all areas are connected by rails as a transit floor.

The control center 100 sends a dispatching instruction to the first handling device 102 in the departure area, sends a handling instruction to a lifting device 108 communicating the transit floor and the departure area, and sends a handling instruction to a lifting device 108 communicating the transit floor and the destination area, so that the first handling device 102 reaches the destination area from the departure area through the two lifting devices 108 and a rail 116 of the transit floor.

Figure 9A:
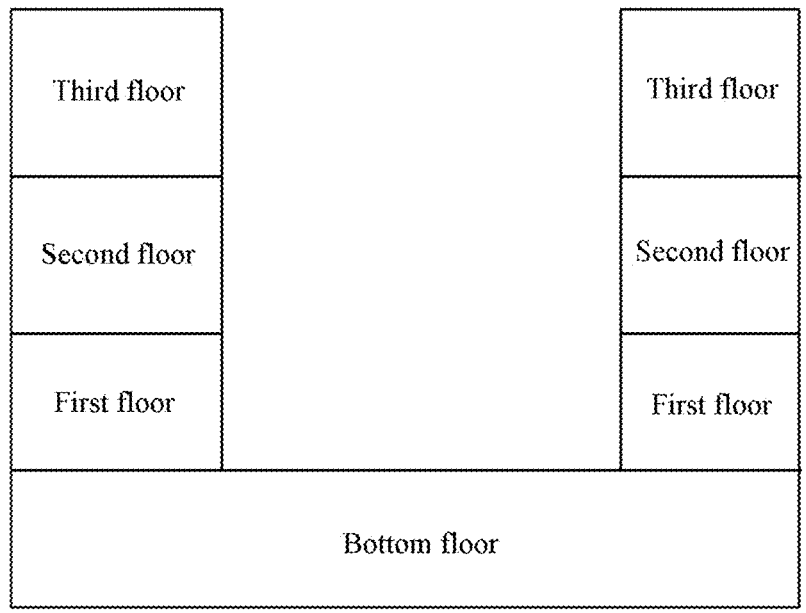
FIG. 9a and FIG. 9b are schematic diagrams of grounds of two three-dimensional warehouses that are connected with each other according to an embodiment of this specification.
Figure 9B:
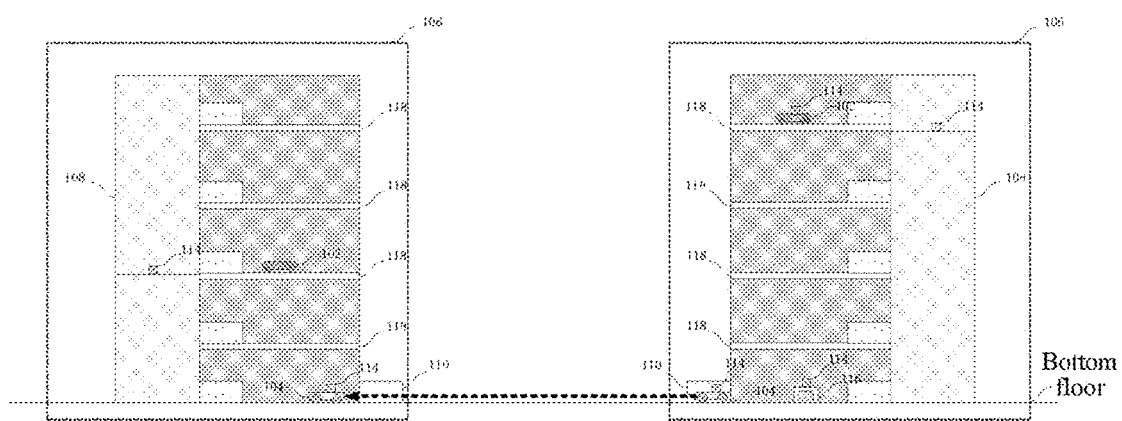

Still further, in the system provided in this specification, in a case that there are two or more three-dimensional warehouses 106, bottom surfaces of the three-dimensional warehouses 106 are connected with each other. As shown in FIG. 9a and FIG. 9b, FIG. 9a is a simple schematic diagram corresponding to FIG. 8 in which the bottom surfaces of the two three-dimensional warehouses are connected with each other. Because the bottom floors of the two three-dimensional warehouses are connected, the two three-dimensional warehouses can be considered as a whole. FIG. 9b is a detailed schematic diagram, it can be seen that the two three-dimensional warehouses are independently arranged on the bottom surfaces.

In addition, the control center 100 may determine, according to at least some to-be-performed handling tasks corresponding to the three-dimensional warehouses 106, a quantity of first handling devices 102 required by each of the three-dimensional warehouses 106.

The control center 100 may determine, according to the quantity of first handling devices 102 required by the each of the three-dimensional warehouses 106 and a current quantity of first handling devices 102 of the each of the three-dimensional warehouses 106, first handling devices 102 that need to be dispatched to the each of the three-dimensional warehouses 106.

The control center 100 may determine a three-dimensional warehouse 106 from which first handling devices 102 are to be dispatched as a departure warehouse, and determine a three-dimensional warehouse 106 into which the first handling devices 106 are to be dispatched as a destination warehouse. The control center 100 may send a dispatching instruction to the first handling devices 102 in the departure warehouse, and send a handling instruction to second handling devices 104, a lifting device 108 of the departure warehouse, and a lifting device 108 of the destination warehouse, so that the first handling devices 102 are dispatched from the departure warehouse to the destination warehouse through the two lifting devices 108 and the second handling devices 104.

The second handling devices 104 are configured to transport the first handling devices 102 from a bottom floor of the departure warehouse to a bottom floor of the destination warehouse according to the dispatching instruction.

It should be noted that, because the first handling devices 102 can travel into the lifting devices 108 through rails, the second handling devices 104 may consider the first handling devices 102 in the lifting devices 108 as the container 114 in the lifting devices 108, and transport the first handling devices 102 out of the lifting devices 108 in the same manner as transferring the container 114. Moreover, because the bottom floors of the three-dimensional warehouses 106 are in connection, the second handling devices 104 can reach another three-dimensional warehouse 106 from one three-dimensional warehouse 106 through the bottom floors, so as to dispatch the first handling devices 102 between different three-dimensional warehouses 106.

In addition, in this specification, an unpowered carrier 120 or a powered carrier 120 is arranged in the lifting device 108, and the higher-floor docking point 112 is provided with at least the carrier 120 located in the lifting device. The powered carrier 120, such as a roller line, a transport line, a two-way telescopic fork, or the like, may actively move a container 114 placed on the carrier 120, and the specific form is not limited, while the unpowered carrier 120 may include at least a container support 116 for placing a container 114 thereon.

The first handling device 102 is further configured to travel to the carrier 120 used as a higher-floor docking point 112 in the lifting device 108, and place the container 114 on the carrier 120, or take out the container 114 from the carrier 120 used as the higher-floor docking point 112.

Figure 10:
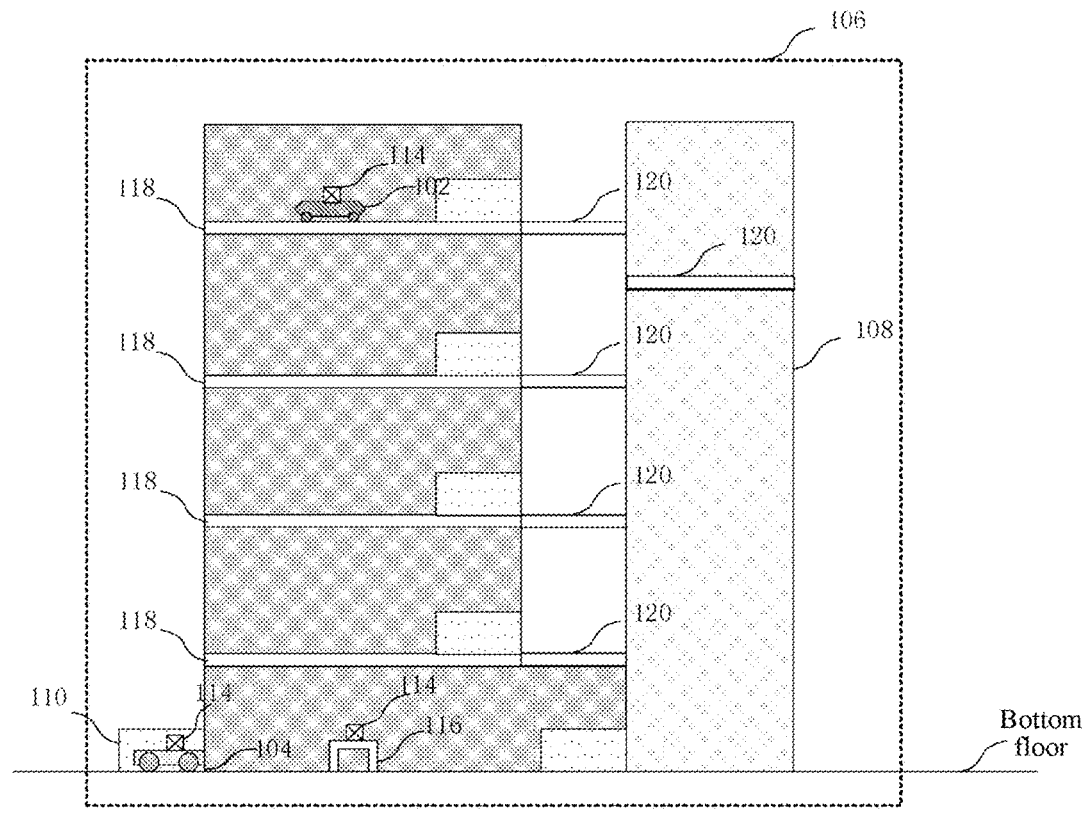
FIG. 10 is a schematic diagram of a carrier in a system according to an embodiment of this specification.

Further, in this specification, the unpowered carrier 120 or the powered carrier 120 is arranged outside at least some positions at which the lifting devices 108 are docked with the higher floors on the higher floors of the three-dimensional warehouse 106. Then, the higher-floor docking point in this specification is at least further provided with the carrier located outside the lifting device, as shown in FIG. 10.

In a case that the lifting device 108 is located on a higher floor, the carrier 120 located outside the lifting device 108 is docked with the carrier 120 located in the lifting device 108. As such, the container 114 is transported from the carrier 120 in the lifting device 108 to the carrier 120 outside the lifting device 108, or the container 114 is transported from the carrier 120 outside the lifting device 108 to the carrier 120 in the lifting device 108.

It should be noted that, in this specification, in a case that the carriers 120 inside and outside the lifting devices 108 are all unpowered carriers 120, the first handling devices 102 may take out or store the container 114 from the side, and push the container 114 onto the carrier 120. In a case that any one of the carriers 120 inside and outside the lifting devices 108 is a powered carrier 120, the container 114 may be pushed by the powered carrier 120.

In addition, in this specification, a specified area of the bottom floor of the three-dimensional warehouse 106 is provided with at least one bottom-floor docking point 110, that is, the bottom-floor docking point 110 may also be a specified area of the bottom floor.

Then, the second handling device 104 is configured to take the container 114 out of the bottom-floor storage spaces or the lifting devices 108, transport the container 114 to the bottom-floor docking point 110, and place the container 114 in the specified area; or take out the container 114 from the bottom-floor docking point 110 in the specified area, and transport the container 114 into the bottom-floor storage spaces or the lifting devices 108.

Because the bottom-floor storage spaces may be provided with a container support 116 for placing the container 114, and a minimum distance between the container support 116 and the bottom floor may be greater than a height of the second handling device 104, there is usually a height difference between the container support 116 of the bottom-floor storage spaces and the bottom floor. Similarly, because the lifting device 108 needs to obtain items from the higher-floor docking point 112, and a height of the higher-floor docking point 112 is adapted to the first handling devices 102, there is usually a height difference between the lifting device 108 and the bottom floor.

Then, in a case that the bottom-floor docking point 110 is located in a specified area on the bottom floor, an apparatus for lifting the container 114 and placing the container 114 needs to be arranged in the second handling device 104, such as a fork that can be lifted or lowered, so that the second handling device 104 transport the container 114 from the specified area on the bottom floor into the bottom-floor storage spaces or the lifting devices 108 at different heights.

Further, in this specification, when the lifting device 108 include a built-in carrier 120, the bottom floor of the three-dimensional warehouse 106 may also be provided with a powered carrier 120. When the lifting device 108 is located on the bottom floor, the carrier 120 on the bottom floor is docked with the carrier 120 located in the lifting device 108, to transport the container 114 from the carrier 120 in the lifting device 108 to the carrier 120 on the bottom floor, so that the second handling device 104 can take out the container 114 from the carrier 120 on the bottom floor. Or when the second handling device 104 places the container 114 on the carrier 120 on the bottom floor, the carrier 120 on the bottom floor can transport the container 114 from the carrier 120 on the bottom floor to the carrier 120 in the lifting device 108.

Figure 11:
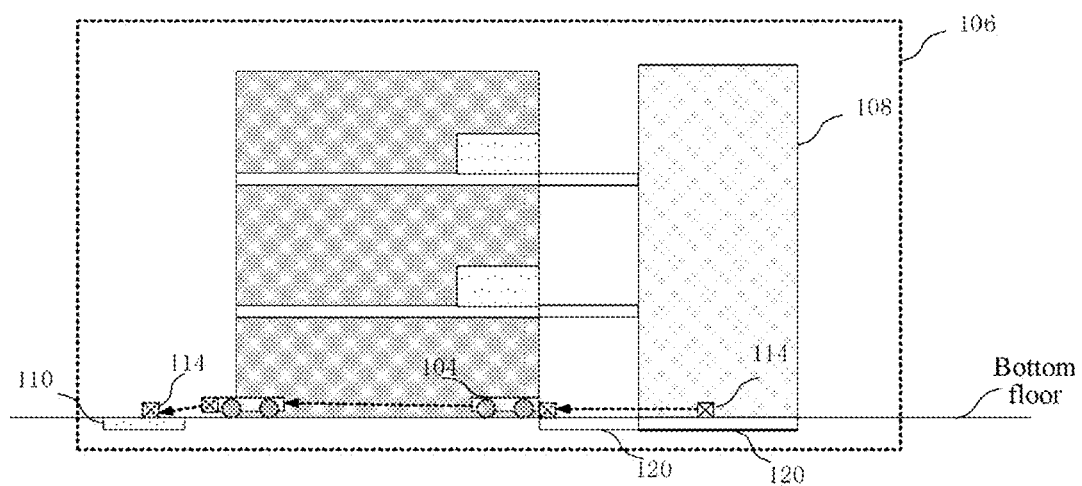
FIG. 11 is a schematic diagram of a specified area being a bottom-floor docking point in a system according to an embodiment of this specification.

Therefore, the second handling device 104 in this specification is further configured to take out the container 114 from the carrier 120 on the bottom floor, transport the container to the bottom-floor docking point 112, and place the container 114 in the specified area. Or, the second handling device 104 may take out the container 114 from the bottom-floor docking point 112 in the specified area, and transport the container 114 to the carrier 120 on the bottom floor. As shown in FIG. 11, a dashed line indicates a movement path of the container 114.

Further, in another implementation of this specification, the control center 100 may send a handling instruction for transporting to a specified area outside the three-dimensional warehouse 106 as required to a second handling device 104, and the second handling device 104 may transport the container 114 to the specified area according to the handling instruction. That is, in this specification, the second handling device 104 is not limited to only operating in the three-dimensional warehouse 106. Because the second handling device 104 operates on a platform of the bottom floor, the second handling device is not limited by a rail, and can be more flexibly connected to an device outside the system or outside the three-dimensional warehouse 106, so as to transport the container 114 out of or transport the container 114 into the three-dimensional warehouse 106. The device outside may be a forklift controlled by a worker, a roller line for conveying the container 114, a production line, an area where workers sort items, or the like, which is not limited in this specification.

Still further, the system may further include: at least one external temporary storage area, where the external temporary storage area is in a form of at least one of three-dimensional storage or planar storage, which is not limited in this specification. In a case that the external temporary storage area is in the form of three-dimensional storage, a lifting device 108 may also be arranged in the external temporary storage area for communicating floors of the external temporary storage area. Certainly: if the external temporary storage area is not provided with a lifting device 108, a container 114 of middle and higher floors of the external temporary storage area may also be transported by a three-dimensional handling device, such as a forklift, and a layout structure of the external temporary storage area may also be in the form shown in FIG. 2 to FIG. 4b.

In this specification, the external temporary storage area and the three-dimensional warehouse 106 may share second handling devices 104, and the second handling devices 104 transport the container 114 between the external temporary storage area and at least one three-dimensional warehouse 106, or are docked with the container 114. For example, when items in the three-dimensional warehouse 106 need to be transported to the external temporary storage area, the control center 100 may send a handling instruction to the second handling devices, and the second handling devices 104 may transport the container 114 to the external temporary storage area for temporary storage.

Certainly, in a case that the external temporary storage area is in the form of planar storage, the external temporary storage area may also be a temporary storage area including a container support 116 arranged on a ground. The external temporary storage area may be used for storing items with a relatively high inbound and outbound frequency, reducing the inbound and outbound frequency of the three-dimensional warehouse 106 by using the container 114, and reducing the time occupying the handling devices during transporting the items with a relatively high inbound frequency. Generally, the storage capacity of the external temporary storage area is less than that of the three-dimensional warehouse 106, and the structure is simpler, as long as items can be temporarily stored. Therefore, the external temporary storage area may only include a container support 116 arranged on a ground as described above.

Based on a three-dimensional warehouse handling and dispatching system for implementing item picking shown in FIG. 2 and the description of the process of performing the handling task described above, it can be seen that in the system provided in this specification implements a combination of using first handling devices and second handling devices in a three-dimensional warehouse, and using a handling function of a lifting device in the three-dimensional warehouse is used. In such way: the first handling devices and the second handling devices can cooperate to transport items in a dense storage warehouse, which avoids laying rails on a bottom floor of the warehouse. Therefore, the layout of the warehouse can be changed flexibly, a quantity of first handling devices required can be reduced, the operating cost of the warehouse can be reduced, and the handling efficiency can be improved.

In addition, in this specification, to increase the flexibility of the path selection of a second handling device 104 not transporting the container 114, a height of the container support 116 in at least some bottom-floor storage spaces of the bottom floor of the three-dimensional warehouse 106 is greater than a height of the second handling device 104 not carrying the container 114.

The second handling device 104 not carrying the container 114 is further configured to selectively pass to below the at least some bottom-floor storage spaces, or transport the container 114 from below the at least some bottom-floor storage spaces in a piggy back manner.

Further, an interval between uprights in the at least some bottom-floor storage spaces of the bottom floor of the three-dimensional warehouse 106 is greater than a width of the second handling device 104. A height of a lowest point of a connector between at least some two adjacent uprights of the bottom floor of the three-dimensional warehouse 106 is higher than the height of the second handling device 104 not carrying the container 114. The second handling device 104 not carrying the container 114 is further configured to selectively travel between at least some two adjacent uprights of the bottom floor.

Figure 12:
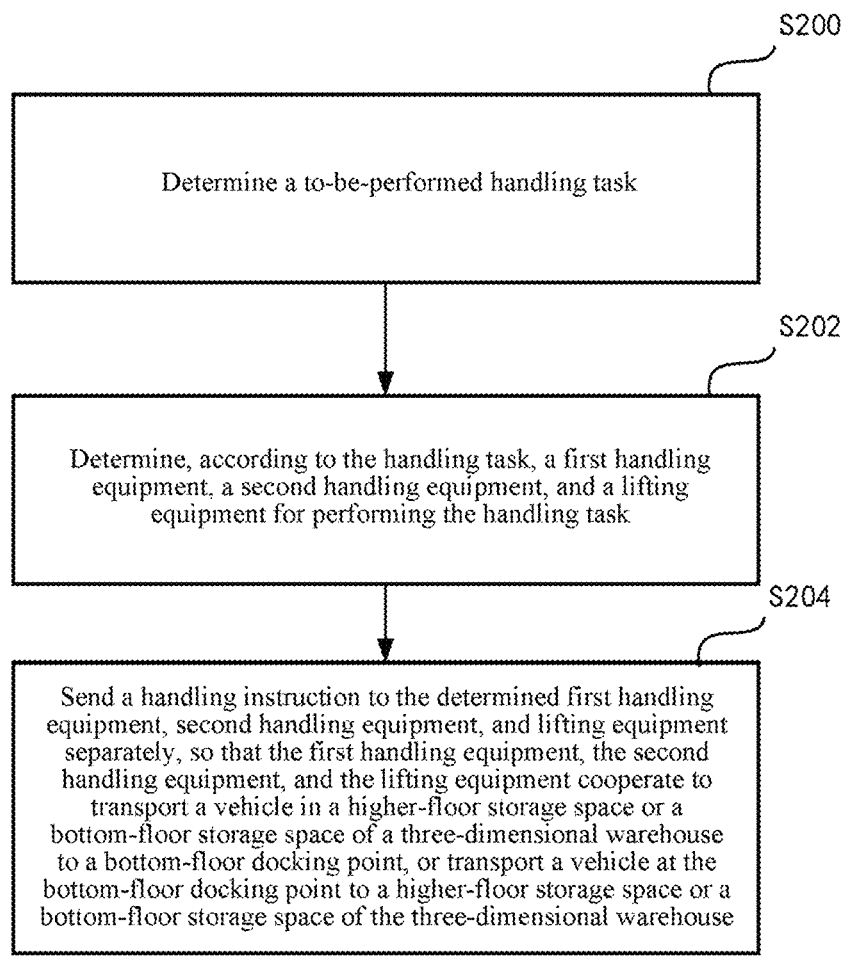
FIG. 12 is a flowchart of a three-dimensional warehouse handling and dispatching process for implementing item picking according to an embodiment of this specification.

Based on the system shown in FIG. 2, this specification also provides a three-dimensional warehouse handling and dispatching method, as shown in FIG. 12.

FIG. 12 is a flowchart of a three-dimensional warehouse handling and dispatching process provided in this specification. There are at least one or more three-dimensional warehouses, floors of the three-dimensional warehouses are connected by at least one lifting device. A bottom floor of the three-dimensional warehouses is provided with at least one bottom-floor docking point. At least some bottom-floor storage spaces are provided with a container and a container support, and the container support in the bottom-floor storage spaces is configured for placing a container transported by a second handling device. Higher floors above the bottom floor of the three-dimensional warehouses are each provided with at least one higher-floor docking point. The higher floors are each provided with a rail for a first handling device to run on, at least some higher-floor storage spaces of the higher floors are provided with a container, and the handling process may specifically include the following steps:

S200: Determine a to-be-performed handling task.

It should be noted that the handling task is used for a three-dimensional warehouse to implement the sorting of items, so that a task of a handling device transporting a container can be determined according to a received order.

S202: Select, according to the handling task, a first handling device, a second handling device, and a lifting device for performing the handling task.

S204: Send a handling instruction to the selected first handling device, second handling device, and lifting device separately, so that the first handling device, the second handling device, and the lifting device cooperate to transport the container from the higher-floor storage spaces or the bottom-floor storage spaces of the three-dimensional warehouses to the bottom-floor docking point, or transport the container at the bottom-floor docking point into the higher-floor storage spaces or the bottom-floor storage spaces of the three-dimensional warehouses.

The handling method provided in this specification may be specifically performed by a control center. The control center may be one or more devices, such as a distributed server including a plurality of servers, which is not limited in this specification. Certainly, because there can be one or more three-dimensional warehouses, a control center may be set to determine handling tasks of the plurality of three-dimensional warehouses, and dispatch devices for performing the handling tasks, or a plurality of control centers may respectively determine different handling tasks and dispatch devices for performing the handling tasks. In a case that there are a plurality of control centers, the control centers may share determined handling tasks, to allow the plurality of control centers to cooperate to perform the plurality of handling tasks.

In addition, for the detailed process of performing the method, reference may be made to the description of the process of performing the handling task in the three-dimensional warehouse handling and dispatching system for implementing item picking described above, and details are not described herein again in this specification.

Further, in this specification, an example in which the control center executes the handling and dispatching process is used for description. Because the first handling device can transport the container from above or from the side of the higher-floor storage spaces, when a handling instruction is sent to the determined first handling device, to enable the first handling device to perform the handling task, the control center may determine, according to the handling task, a higher-floor storage space corresponding to the handling task. The control center can send a handling instruction to the determined first handling device according to a position of the higher-floor storage space and an aisle position adjacent to the higher-floor storage space. The first handling device, at the aisle position, may thus take out a container indicated in the handling instruction from a side of the higher-floor storage space to the first handling device according to the handling instruction. Or, the first handling device may place the container indicated in the handling instruction in the first handling device into the higher-floor storage space from the side according to the handling instruction.

The aisle position adjacent to the higher-floor storage spaces is an aisle position where there is no warehouse structure such as a three-dimensional warehouse reinforcement structure (such as reinforcing ribs) or partitions between higher-floor storage spaces. Because an aisle is a passage for the first handling device to travel through when transporting the container, there needs to be an unblocked passage between each of the higher-floor storage spaces and an adjacent aisle. Certainly, in the system described above, there may be various plane layouts of the three-dimensional warehouse. Then, at least by transporting other containers, any one of the higher-floor storage spaces can also be in connection with the aisle.

Alternatively, the control center may determine, according to a handling task, a higher-floor storage space corresponding to the handling task, and send the handling instruction to the selected first handling device according to a position of the higher-floor storage space and positions of other storage spaces above the higher-floor storage space. The first handling device may thereby take out a container indicated in the handling instruction from the positions of other higher-floor storage spaces above the higher-floor storage space, or the first handling device may lower the container to the higher-floor storage space.

In addition, in this specification, the second handling device may also take items out of the bottom-floor storage spaces in different manners, such as transporting the container from below or from the side of the bottom-floor storage spaces. Therefore, when sending a handling instruction to the selected second handling device to enable the second handling device to perform the handling task, the control center may determine, according to a handling task, a bottom-floor storage space corresponding to the handling task. The control center may send the handling instruction to the second handling device according to a position of the bottom-floor storage space and an aisle position adjacent to the bottom-floor storage space. The second handling device, at the aisle position adjacent to the bottom-floor storage space, may thereby take out a container indicated in the handling instruction from a side of the bottom-floor storage space to the second handling device, or may place the container in the second handling device into the bottom-floor storage space.

Further, the control center may further determine, according to a handling task, a bottom-floor storage space corresponding to the handling task, and send the handling instruction to the second handling device according to a position of the bottom-floor storage space. The second handling device may therefore, at an aisle position adjacent to the bottom-floor storage space, enters to below the bottom-floor storage space, and takes out a container indicated in the handling instruction from below the bottom-floor storage space to the second handling device, or may place the container in the second handling device into the bottom-floor storage space.

In addition, in a case, a rail is arranged in the lifting device, and is configured to be connected to the rail arranged in each of the higher floors, to allow the first handling device to travel into the lifting device.

The control center may further be configured to determine, at least in part according to a to-be-performed handling task of each of the higher floors, a quantity of first handling devices required by the each of the higher floors. The control center may further be configured to determine, according to the quantity of first handling devices required by the each of the higher floors and a current quantity of first handling devices of the each of the higher floors, first handling devices that need to be dispatched to the each of the higher floors. The control center can then send a dispatching instruction to the determined first handling devices that need to be dispatched, so that the first handling devices are further configured to travel into the lifting devices according to the received dispatching instruction, and reach a higher floor specified in the dispatching instruction through the lifting devices.

Further, if the higher-floor docking point is set to be located in the lifting device, when sending a handling instruction to the first handling device, the control center may determine, according to a handling task, a higher-floor docking point in the lifting device corresponding to the handling task. The control center may send the handling instruction to the determined first handling device according to a position of the higher-floor docking point in the lifting device. The first handling device may thereby travel to the higher-floor docking point in the lifting device, and place a container at the higher-floor docking point, or take out a container from the position of the higher-floor docking point.

Still further, an unpowered carrier or a powered carrier is arranged in the lifting device, and the higher-floor docking point is provided with at least the carrier located in the lifting device. Then, the control center may determine, according to a handling task, a higher-floor docking point in a lifting device corresponding to the handling task; and send the handling instruction to the determined first handling device according to a position of the higher-floor docking point in the lifting device. The first handling device may thereby travel to a carrier that is used as the higher-floor docking point in the lifting device, and place a container on the carrier, or take out a container from the carrier that is used as the higher-floor docking point.

In addition, if an unpowered carrier or a powered carrier is further arranged outside the lifting device, and the higher-floor docking point is further provided with at least the carrier outside the lifting device, the control center may further determine, according to a handling task, a higher-floor docking point corresponding to the handling task. The control center may send the handling instruction to the lifting device according to a floor on which the higher-floor docking point is arranged, so that the lifting device, on the floor on which the higher-floor docking point is arranged, is docked with the carrier located in the lifting device through the carrier located outside the lifting device. The lifting device can then transport the container from the carrier located in the lifting device to the carrier that is located outside the lifting device and used as the higher-floor docking point. Or, the lifting device can transport the container on the carrier that is located outside the lifting device and used as the higher-floor docking point to the carrier in the lifting device.

In addition, in this specification, the bottom-floor docking point of the bottom floor of the three-dimensional warehouse is an area of the three-dimensional warehouse for the docking with a container outside. If there is a device such as a forklift outside the three-dimensional warehouse that can fork and pick a container from the bottom floor, at least one bottom-floor docking point can be arranged in a specified area on the bottom floor of the three-dimensional warehouse. When sending the handling instruction to the determined second handling device, the control center may also determine, according to a handling task, a bottom-floor docking point arranged in a specified area corresponding to the handling task. The control center may send a handling instruction to the second handling device according to the bottom-floor docking point arranged in the specified area, so that the second handling device can take a container indicated in the handling instruction out of the bottom-floor storage spaces or the lifting devices, transport the container to the bottom-floor docking point, and place the container in the specified area. Or the second handling device can take outs a container indicated in the handling instruction from the bottom-floor docking point in the specified area, and transport the container into the bottom-floor storage spaces or the lifting devices.

Further, a powered carrier may further be arranged in the lifting device, and correspondingly, the bottom ground of the three-dimensional warehouse is provided with a powered carrier. When controlling the lifting device to transport the container, the control center may determine, according to a handling task, a bottom-floor docking point corresponding to the handling task. The control center can send a handling instruction for moving to the bottom floor to the lifting device, so that the lifting device moves to the bottom floor. The carrier on the bottom ground is docked with the carrier located in the lifting device, to transport the container from the carrier in the lifting device to the carrier on the bottom ground, or transport the container on the carrier on the bottom ground to the carrier in the lifting device.

In a case described above, the container on the bottom floor is transported from the lifting device to the carrier on the bottom floor. Then, the control center may determine, according to a handling task, a bottom-floor docking point arranged in a specified area corresponding to the handling task, and send a handling instruction to the second handling device according to the bottom-floor docking point arranged in the specified area. The second handling device takes out a container from the carrier on the bottom ground, transports the container to the bottom-floor docking point, and places the container in the specified area. Or when the second handling device is to transport the container to the lifting device, the container can be lifted to other floors by the lifting device. The second handling device may take out a container indicated in the handling instruction from the bottom-floor docking point in the specified area according to the received handling instruction, and transport the container to the carrier on the bottom ground.

In addition, in some cases, the higher floors of the three-dimensional warehouse include a higher floor where not all areas are connected by rails. For the higher floor where not all areas are connected by rails, in a case that the control center determines that a first handling device needs to be dispatched between different areas of the higher floor, for example, according to the need to perform the handling task as described in the foregoing system, then the control center may determine an area from which the first handling device is to be dispatched as a departure area, determine an area into which the first handling device is to be dispatched as a destination area. The control center may further determine another higher floor closest to the higher floor where all areas are connected by rails as a transit floor. The control center may send a dispatching instruction to the first handling device in the departure area, send a handling instruction to a lifting device communicating the transit floor and the departure area, and send a handling instruction to a lifting device communicating the transit floor and the destination area. In such way, the first handling device can reach the destination area from the departure area through the two lifting devices and the transit floor.

Still further, in some cases, there are two or more three-dimensional warehouses. For example, the bottom surfaces of the three-dimensional warehouses are connected with each other. When determining that the first handling device needs to be dispatched between different three-dimensional warehouses, the control center may determine a three-dimensional warehouse from which the first handling device is to be dispatched as a departure warehouse, and determine a three-dimensional warehouse into which the first handling device is to be dispatched as a destination warehouse.

The control center may send a dispatching instruction to the first handling device in the departure warehouse, and send a handling instruction to a second handling device, a lifting device of the departure warehouse, and a lifting device of the destination warehouse. In such way, the first handling device is dispatched from the departure warehouse to the destination warehouse through the two lifting devices and the second handling device.

In addition, in another embodiment provided in this specification, one or more external temporary storage areas are arranged outside the three-dimensional warehouses. The external temporary storage areas can be in a form of three-dimensional storage or planar storage. The external temporary storage areas and the three-dimensional warehouses share at least some of the second handling devices, or the second handling devices transport and/or are docked with the container between the external temporary storage areas and at least one of the three-dimensional warehouses.

Then, when determining a to-be-performed handling task, the control center may determine the to-be-performed handling task according to item inventory information and order information stored in the external temporary storage areas and the three-dimensional warehouses. That is, items stored in the external temporary storage areas and the item storage capacity of the external temporary storage areas need to be taken into consideration.

Based on the method shown in FIG. 12, the first handling devices and second handling devices in a three-dimensional warehouse are used in combination, and a handling function of a lifting device in the three-dimensional warehouse is used. As such, the first handling devices and the second handling devices can cooperate to transport items in a dense storage warehouse, which avoids laying rails on a bottom floor of the warehouse. The layout of the warehouse can therefore by changed flexibly, a quantity of first handling devices required can be reduced, the operating cost of the warehouse can be reduced, and the transport efficiency can be improved.

In the 1990s, improvements of a technology can be clearly distinguished between hardware improvements (for example, improvements to a circuit structure such as a diode, a transistor, or a switch) and software improvements (improvements to a method procedure). However, with the development of technology, improvements of many method procedures can be considered as direct improvements of hardware circuit structures. Designers almost all program an improved method procedure to a hardware circuit, to obtain a corresponding hardware circuit structure. Therefore, it does not mean that the improvement of a method procedure cannot be implemented by using a hardware entity module. For example, a programmable logic device (PLD) (for example, a field programmable gate array (FPGA)) is a type of an integrated circuit whose logic function is determined by a user by programming the device. The designers perform voluntary programming to "integrate" a digital system into a single PLD without requiring a chip manufacturer to design and prepare a dedicated integrated circuit chip. Moreover, nowadays, instead of manually making integrated circuit chips, this programming is mostly implemented by using "logic compiler" software, which is similar to the software compiler used in program development and writing. The original code is written in a specific programming language before compiling, and this language is referred to as a hardware description language (HDL). There are various kinds of HDLs, for example, advanced Boolean expression language (ABEL), altera hardware description language (AHDL), Confluence, Cornell university programming language (CUPL), HDCal, Java hardware description language (JHDL), Lava, Lola, MyHDL, PALASM, Ruby hardware description language (RHDL), and the like. Currently, the most commonly used HDLs are very-high-speed integrated circuit hardware description language (VHDL) and Verilog. A person skilled in the art should also understand that provided that a method procedure is logically programmed and then programmed to an integrated circuit by using the foregoing hardware description languages, a hardware circuit that implements the logical method procedure can be easily obtained.

The controller can be implemented in any appropriate manner. For example, the controller can take the form of, for example, a microprocessor or processor and a computer-readable medium storing computer-readable program code (for example, software or firmware) executable by the (micro) processor, a logic gate, a switch, an application-specific integrated circuit (ASIC), a programmable logic controller, and an embedded microcontroller. Examples of the controller include, but are not limited to, the following microcontrollers: ARC 625D, Atmel AT91SAM, Microchip PIC18F26K20, and Silicone Labs C8051F320. The memory controller can also be implemented as a part of the memory control logic. A person skilled in the art also appreciates that, in addition to implementing the controller in the form of pure computer-readable program code, it is also possible to implement, by logically programming the method steps, the controller in the form of a logic gate, switch, ASIC, programmable logic controller, and embedded microcontroller and other forms to achieve the same function. Such a controller can thus be considered as a hardware component, and apparatuses included therein for implementing various functions can also be considered as structures inside the hardware component. Alternatively, apparatuses configured to implement various functions can be considered as both software modules implementing the method and structures inside the hardware component.

The system, the apparatus, the module or the unit described in the foregoing embodiments may be implemented by a computer chip or an entity, or implemented by a product having a certain function. A typical implementation device is a computer. Specifically, the computer may be, for example, a personal computer, a laptop computer, a cellular phone, a camera phone, a smartphone, a personal digital assistant, a media player, a navigation device, an email device, a game console, a tablet computer, a wearable device, or a combination of any of these devices.

For ease of description, when the apparatus is described, the apparatus is divided into units according to functions, which are separately described. Certainly, during implementation of this specification, the functions of the units may be implemented in the same piece of or a plurality of pieces of software and/or hardware.

A person skilled in the art can understand that the embodiments of the present disclosure may be provided as a method, a system, or a computer program product. Therefore, the present disclosure may use a form of hardware-only embodiments, software-only embodiments, or embodiments combining software and hardware. In addition, the present disclosure may use a form of a computer program product that is implemented on one or more computer-usable storage media (including but not limited to a disk memory, a CD-ROM, an optical memory, and the like) that include computer-usable program code.

The present disclosure is described with reference to flowcharts and/or block diagrams of the method, device (system), and computer program product in the embodiments of the present disclosure. It should be understood that computer program instructions can implement each procedure and/or block in the flowcharts and/or block diagrams and a combination of procedures and/or blocks in the flowcharts and/or block diagrams. These computer program instructions may be provided to a general-purpose computer, a dedicated computer, an embedded processor, or a processor of another programmable data processing device to generate a machine, so that an apparatus configured to implement functions specified in one or more procedures in the flowcharts and/or one or more blocks in the block diagrams is generated by using instructions executed by the general-purpose computer or the processor of another programmable data processing device.

These computer program instructions may also be stored in a computer readable memory that can instruct a computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded into a computer or another programmable data processing device, so that a series of operation steps are performed on the computer or another programmable data processing device to generate processing implemented by a computer, and instructions executed on the computer or another programmable data processing device provide steps for implementing functions specified in one or more procedures in the flowcharts and/or one or more blocks in the block diagrams.

In a typical configuration, a computing device includes one or more processors (CPUs), an input/output (I/O) interface, a network interface, and an internal memory.

The internal memory may include a form such as a volatile memory, a random-access memory (RAM) and/or a non-volatile memory such as a read-only memory (ROM) or a flash RAM in a computer-readable medium. The internal memory is an example of the computer-readable medium.

The computer-readable medium includes a non-volatile medium and a volatile medium, a removable medium and a non-removable medium, which may implement storage of information by using any method or technology. Information may be a computer-readable instruction, a data structure, a program module, or other data. Examples of computer storage media include but are not limited to a phase change memory (PRAM), a static random access memory (SRAM), a dynamic random access memory (DRAM), another type of RAM, a ROM, an electrically erasable programmable read-only memory (EEPROM), a flash memory or another memory technology, a CD-ROM, a digital versatile disc (DVD) or another optical storage, a cassette magnetic tape, tape and disk storage or another magnetic storage device or any other non-transmission media that may be configured to store information that a computing device can access. Based on the definition in this specification, the computer-readable medium does not include transitory computer readable media (transitory media), such as a modulated data signal and a carrier.

It should be further noted that the terms "include". "comprise", or any variants thereof are intended to cover a non-exclusive inclusion. Therefore, a process, method, article, or device that includes a series of elements not only includes such elements, but also includes other elements not specified expressly, or may include inherent elements of the process, method, article, or device. Unless otherwise specified, an element limited by "include a/an . . . " does not exclude other same elements existing in the process, the method, the article, or the device that includes the element.

A person skilled in the art should understand that the embodiments of this specification may be provided as a method, a system, or a computer program product. Therefore, this specification may use a form of hardware only embodiments, software only embodiments, or embodiments with a combination of software and hardware. Moreover, this specification may use a form of a computer program product that is implemented on one or more computer-usable storage media (including but not limited to a disk memory, a CD-ROM, an optical memory, and the like) that include computer-usable program code.

This specification can be described in the general context of computer-executable instructions executed by a computer, for example, program modules. Generally, the program module includes a routine, a program, an object, a component, a data structure, and the like for executing a particular task or implementing a particular abstract data type. This specification may also be implemented in a distributed computing environment in which tasks are performed by remote processing devices connected by using a communication network. In a distributed computing environment, the program module may be located in both local and remote computer storage media including storage devices.

The embodiments of this specification are all described in a progressive manner, for same or similar parts in the embodiments, refer to these embodiments, and descriptions of each embodiment focus on a difference from other embodiments. Especially, a system embodiment is basically similar to a method embodiment, and therefore is described briefly: for related parts, reference may be made to partial descriptions in the method embodiment.

The descriptions are merely embodiments of this specification, and are not intended to limit this specification. For a person skilled in the art, various modifications and changes may be made to this specification. Any modification, equivalent replacement, and improvement made within the spirit and principle of this specification shall fall within the scope of the claims of this specification.

What is claimed is:

1. A three-dimensional warehouse handling and dispatching system for implementing item picking, the system comprising:
   one or more control centers;
   one or more first handling devices;
   one or more second handling devices;
   a plurality of lifting devices; and
   at least one three-dimensional warehouse comprising a plurality of floors that are connected with one another by at least one of the plurality of lifting devices,
   wherein the one or more control centers are configured to communicate with the one or more first handling devices and the one or more second handling devices,
   wherein the plurality of floors of the at least one three-dimensional warehouse comprise:
      a bottom floor having at least one bottom-floor docking point and one or more bottom-floor storage spaces, wherein the bottom floor is provided with the one or more second handling devices, wherein at least one of the one or more bottom-floor storage spaces is provided with a container support, wherein the container support is configured to support a container transported by the one or more second handling devices, and
      one or more higher floors above the bottom floor, each of the one or more higher floors having at least one higher-floor docking point and one or more higher-floor storage spaces, wherein each of the one or more higher floors is provided with a rail and a first handling device that runs on the rail, wherein at least one higher-floor storage space is provided with a corresponding container, wherein at least one of the floors reachable by the at least one of the plurality of lifting devices overlaps with at least one of the floors reachable by another lifting device of the plurality of lifting devices, and wherein the at least one of the plurality of lifting devices comprises a rail configured to be connected to a rail arranged in each of the one or more higher floors to allow the one or more first handling devices to travel into the at least one of the plurality of lifting devices, and
   wherein the one or more control centers are configured to:
      select, according to a handling task, a first handling device, a second handling device, and a lifting device for performing the handling task, and
      send a handling instruction for performing the handling task separately to the first handling device, the second handling device, and the lifting device,
   wherein the first handling device is configured to:
      take a container indicated in the handling instruction out of a higher-floor storage space of a higher floor of the one or more higher floors according to the handling instruction, and
      transport, on the higher floor, the container from the higher-floor storage space to a higher-floor docking point of the higher floor,
   wherein the lifting device is configured to:
      ascend to the higher floor according to the handling instruction, and
      transport, from the higher floor to the bottom floor, the container from the higher-floor docking point to the bottom-floor docking point; and
   wherein the second handling device is configured to:
      transport, on the bottom floor, the container from the bottom-floor docking point to a bottom-floor storage space of the bottom floor according to the handling instruction.

2. The system according to claim 1, wherein the first handling device is configured to:
   at a rail adjacent to the higher-floor storage space, take out the container from a side of the higher-floor storage space; or
   take out the container from a top of the higher-floor storage space.

3. The system according to claim 1, wherein the one or more control centers are configured to:
   determine, at least partially according to a handling task of each of the one or more higher floors, a quantity of first handling devices required by a higher floor of the one or more higher floors,
   determine, according to the quantity of first handling devices required by the higher floor and a current quantity of first handling devices on the higher floor, one or more first handling devices to be dispatched to the higher floor, and
   send a dispatching instruction to the one or more first handling devices to be dispatched to the higher floor, wherein the dispatching instruction specifies the higher floor that the one or more first handling devices are to be dispatched to,
   wherein each of the one or more first handling devices is configured to travel into a corresponding lifting device of the plurality of lifting devices according to the dispatching instruction,
   wherein the corresponding lifting device transports the first handling device to the higher floor specified in the dispatching instruction, and places the first handling device at the higher-floor docking point of the higher floor.

4. The system according to claim 3, wherein the one or more higher floors of the three-dimensional warehouse comprise a particular higher floor where not all areas are connected by rails, and
   wherein the one or more control centers are configured to:
      in response to determining that a particular first handling device is to be dispatched between different areas of the particular higher floor,
         determine an area from which the particular first handling device is to be dispatched as a departure area, determine an area into which the particular first handling device is to be dispatched as a destination area, and determine another higher floor closest to the particular higher floor where all areas are connected by rails as a transit floor, and
         send a dispatching instruction to the particular first handling device in the departure area, send a first handling instruction to a first lifting device connecting the transit floor and the departure area, and send a second handling instruction to a second lifting device connecting the transit floor and the destination area, such that the particular first handling device reaches the destination area from the departure area through the first lifting device, the second lifting device, and the transit floor.

5. The system according to claim 3, comprising at least two three-dimensional warehouses, wherein bottom surfaces of the three-dimensional warehouses are connected with each other,
wherein the one or more control centers are configured to:
in response to determining that a particular first handling device is to be dispatched between different three-dimensional warehouses,
determine a first three-dimensional warehouse from which first handling devices are to be dispatched as a departure warehouse, and determine a second three-dimensional warehouse into which the first handling devices are to be dispatched as a destination warehouse, and
send a dispatching instruction to the first handling devices in the departure warehouse, a first lifting device of the departure warehouse, and a second lifting device of the destination warehouse, such that the first handling devices are dispatched from the departure warehouse to the destination warehouse through the first lifting device, the second lifting device, and the second handling devices, wherein the second handling devices are configured to transport the first handling devices from a bottom floor of the departure warehouse to a bottom floor of the destination warehouse according to the handling instruction.

6. The system according to claim 1, further comprising:
a first carrier arranged in a lifting device of the plurality of lifting devices, and
a second carrier arranged outside of the lifting device,
wherein the first carrier or the second carrier comprises an unpowered carrier or a powered carrier, wherein the unpowered carrier comprises at least a container support configured for placing the container, and the powered carrier comprises at least one of a conveyor or a two-way telescopic fork,
wherein the first handling device is configured to travel to the first carrier and place the container on the first carrier, and
wherein the second carrier is configured to be docked with the first carrier, such that the container is transported from the first carrier to the second carrier.

7. The system according to claim 1, wherein a height of the container support in the at least one of the one or more bottom-floor storage spaces is higher than a height of the second handling device that is not carrying a container, and the second handling device that is not carrying a container is configured to pass under the container placed on the container support, and
wherein an interval between uprights in the at least one of the one or more bottom-floor storage spaces is greater than a width of the second handling device, and a height of a lowest point of a connector between at least two adjacent uprights of the bottom floor is higher than the height of the second handling device that is not carrying a container, and the second handling device that is not carrying a container is configured to travel between the at least two adjacent uprights.

8. The system according to claim 1, wherein the second handling device is configured to:
at an aisle adjacent to the bottom-floor storage space, load the container into the bottom-floor storage space from a side of the bottom-floor storage space, or
at the aisle adjacent to the bottom-floor storage space, load the container into the bottom-floor storage space from a bottom of the bottom-floor storage space.

9. The system according to claim 1, wherein a specified area of the bottom floor is provided with the bottom-floor docking point, and the second handling device is configured to:
take the container out of the bottom-floor storage space or the lifting device,
transport the container to the bottom-floor docking point, and
place the container in the specified area,
wherein a first powered carrier is further arranged in the lifting device, and the bottom floor is provided with a second powered carrier, and wherein, when the lifting device reaches the bottom floor, the second power carrier is configured to be docked next to the first powered carrier, wherein the first powered carrier transports the container from the first powered carrier to the second powered carrier, and
wherein the second handling device is further configured to:
take out the container from the second powered carrier, transport the container to the bottom-floor docking point, and
and place the container in the specified area.

10. The system according to claim 1, further comprising one or more external temporary storage areas, wherein the one or more external temporary storage areas are in a form of at least one of a three-dimensional storage or a planar storage,
wherein the one or more external temporary storage areas and the at least one three-dimensional warehouse share at least one of the one or more second handling devices, or the one or more second handling devices are configured to transport the container between the one or more external temporary storage areas and the at least one three-dimensional warehouse, and
wherein the one or more control centers are further configured to store item inventory information of the one or more external temporary storage areas and the at least one three-dimensional warehouse.

11. The system according to claim 1, wherein the one or more control centers are configured to send the handling instruction by:
determining, according to the handling task, a position of a bottom-floor storage space corresponding to the handling task; and
sending the handling instruction to the second handling device according to the position of the bottom-floor storage space and an aisle adjacent to the bottom-floor storage space, such that the second handling device, at the aisle adjacent to the bottom-floor storage space, takes out the container from the bottom-floor storage space from a side of the bottom-floor storage space, or places the container in the second handling device into the bottom-floor storage space from the side.

12. A three-dimensional warehouse handling and dispatching method for implementing item picking, the method comprising:
determining a handling task in one or more three-dimensional warehouses, wherein floors of the one or more three-dimensional warehouses are connected by at least one lifting device, wherein each of the one or more three-dimensional warehouses comprises a bottom floor and one or more higher floors above the bottom floor, wherein each of the one or more higher floors comprises at least one higher-floor docking point and is provided with a rail and at least one first handling device that runs on the rail, wherein at least one higher-floor storage space of the one or more higher floors is provided with a corresponding container, and wherein the bottom floor comprises at least one bottom-floor docking point and is provided with one or more second handling devices, wherein at least one bottom-floor storage space is provided with at least a container support, the container support being configured to support a container transported by one or more second handling devices;

selecting, according to the handling task, a first handling device, a second handling device, and a lifting device for performing the handling task; and sending a handling instruction separately to the first handling device, the second handling device, and the lifting device, such that the first handling device, the second handling device, and the lifting device are cooperated to:

transport, by the first handling device, a container indicated in the handling instruction from a higher-floor storage space to a higher-floor docking point;

transport, by the lifting device, the container from the higher-floor docking point to the bottom-floor docking point; and transport, by the second handling device, the container from the bottom-floor docking point to a bottom-floor storage space of the at least one bottom-floor storage space, wherein a rail is arranged in the lifting device and configured to be connected to the rail arranged in each of the one or more higher floors to guide the first handling device to travel into the lifting device, wherein a higher-floor docking point of the one or more higher floors is arranged in the lifting device, and wherein sending the handling instruction to the first handling device comprises:

determining, according to the handling task, the higher-floor docking point in the lifting device corresponding to the handling task, and sending the handling instruction to the first handling device according to a position of the higher-floor docking point in the lifting device, such that the first handling device travels to the higher-floor docking point in the lifting device, and places the container at the higher-floor docking point, or takes out the container from a position of the higher-floor docking point.

13. The method according to claim 12, wherein sending the handling instruction to the first handling device comprises one of:

determining, according to the handling task, the higher-floor storage space corresponding to the handling task, and sending the handling instruction to the first handling device according to a position of the higher-floor storage space and an aisle adjacent to the higher-floor storage space, such that the first handling device, at the aisle, takes out the container from a side of the higher-floor storage space, or determining, according to the handling task, the higher-floor storage space corresponding to the handling task, and sending the handling instruction to the first handling device according to a position of the higher-floor storage space and a storage space above the higher-floor storage space, such that the first handling device, at the storage space above the higher-floor storage space, takes out the container from a top of the higher-floor storage space.

14. The method according to claim 12, wherein a carrier is arranged in the lifting device, and the carrier comprises an unpowered carrier or a powered carrier, wherein sending the handling instruction to the first handling device comprises:

determining, according to the handling task, the higher-floor docking point that the lifting device is stopped at; and sending the handling instruction to the first handling device according to a position of the higher-floor docking point that the lifting device is stopped at, such that the first handling device travels to the carrier and loads the container on the carrier, or unloads the container from the carrier.

15. The method according to claim 12, wherein sending the handling instruction to the second handling device comprises:

determining, according to the handling task, a position of a bottom-floor storage space corresponding to the handling task; and sending the handling instruction to the second handling device according to the position of the bottom-floor storage space and an aisle adjacent to the bottom-floor storage space, such that the second handling device, at the aisle adjacent to the bottom-floor storage space, takes out the container from the bottom-floor storage space from a side of the bottom-floor storage space, or places the container in the second handling device into the bottom-floor storage space from the side.

16. The method according to claim 12, wherein sending the handling instruction to the second handling device comprises:

determining, according to the handling task, a position of a bottom-floor storage space corresponding to the handling task; and sending the handling instruction to the second handling device according to the position of the bottom-floor storage space, such that the second handling device, at an aisle adjacent to the bottom-floor storage space, takes out the container from a bottom of the bottom-floor storage space, or places the container into the bottom-floor storage space.

17. The method according to claim 12, wherein a specified area of the bottom floor is provided with the at least one bottom-floor docking point, and wherein sending the handling instruction to the second handling device comprises:

determining, according to the handling task, a bottom-floor docking point arranged in the specified area corresponding to the handling task, and sending the handling instruction to the second handling device according to the bottom-floor docking point arranged in the specified area, such that the second handling device takes the container out of the bottom-floor storage space or the lifting device, transports the container to the bottom-floor docking point, and places the container in the specified area, or takes out the container from the bottom-floor docking point arranged in the specified area and transports the container into the bottom-floor storage space or the lifting device.

18. The method according to claim 17, wherein a first powered carrier is arranged in the lifting device, and a bottom ground of the one or more three-dimensional warehouses is provided with a second powered carrier, and
wherein sending the handling instruction to the lifting device comprises:
determining, according to the handling task, the bottom-floor docking point corresponding to the handling task; and
sending the handling instruction to the lifting device, such that the lifting device moves to the bottom floor according to the handling instruction, and the second powered carrier is docked next to the first powered carrier, wherein the first powered carrier transports the container from the first powered carrier to the second powered carrier.

19. The method according to claim 12, further comprising:
arranging one or more external temporary storage areas outside the one or more three-dimensional warehouses, wherein the one or more external temporary storage areas are in a form of three-dimensional storage or planar storage, and wherein the one or more external temporary storage areas and the one or more three-dimensional warehouses share at least one of the one or more second handling devices, or the one or more second handling devices transport the container between the one or more external temporary storage areas and at least one of the one or more three-dimensional warehouses,
wherein determining the handling task comprises:
determining the handling task according to item inventory information and order information stored in the one or more external temporary storage areas and the one or more three-dimensional warehouses.

20. A three-dimensional warehouse handling and dispatching system for implementing item picking, the system comprising:
one or more control centers;
one or more first handling devices;
one or more second handling devices;
at least one lifting device; and
at least one three-dimensional warehouse comprising a plurality of floors that are connected with one another by the at least one lifting device,
wherein the one or more control centers are configured to communicate with the one or more first handling devices and the one or more second handling devices,
wherein the plurality of floors of the at least one three-dimensional warehouse comprise:
a bottom floor having at least one bottom-floor docking point and one or more bottom-floor storage spaces, wherein the bottom floor is provided with the one or more second handling devices, wherein at least one of the one or more bottom-floor storage spaces is provided with a container support, wherein the container support is configured to support a container transported by the one or more second handling devices, and
one or more higher floors above the bottom floor, each of the one or more higher floors having at least one higher-floor docking point and one or more higher-floor storage spaces, wherein each of the one or more higher floors is provided with a rail and a first handling device that runs on the rail, wherein at least one higher-floor storage space is provided with a corresponding container, and
wherein the one or more control centers are configured to:
select, according to a handling task, a first handling device, a second handling device, and a lifting device for performing the handling task, and
send a handling instruction for performing the handling task separately to the first handling device, the second handling device, and the lifting device,
wherein the first handling device is configured to:
take a container indicated in the handling instruction out of a higher-floor storage space of a higher floor of the one or more higher floors according to the handling instruction, and
transport, on the higher floor, the container from the higher-floor storage space to a higher-floor docking point of the higher floor,
wherein the lifting device is configured to:
ascend to the higher floor according to the handling instruction, and
transport, from the higher floor to the bottom floor, the container from the higher-floor docking point to the bottom-floor docking point,
wherein the second handling device is further configured to:
transport, on the bottom floor, the container from the bottom-floor docking point to a bottom-floor storage space of the bottom floor according to the handling instruction, and
wherein the second handling device is configured to:
at an aisle adjacent to the bottom-floor storage space, load the container into the bottom-floor storage space from a side of the bottom-floor storage space, or
at the aisle adjacent to the bottom-floor storage space, load the container into the bottom-floor storage space from a bottom of the bottom-floor storage space.

* * * * *